(12) United States Patent
Maturana et al.

(10) Patent No.: US 7,991,602 B2
(45) Date of Patent: Aug. 2, 2011

(54) AGENT SIMULATION DEVELOPMENT ENVIRONMENT

(75) Inventors: Francisco P. Maturana, Mayfield Hts, OH (US); Pavel Vrba, Plzen (CZ); Raymond J. Staron, Richmond Heights, OH (US); Kenwood H. Hall, Hudson, OH (US); Petr Slechta, Ceska-Lipa (CZ); Pavel Tichy, Nymburk (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 355 days.

(21) Appl. No.: 11/044,233

(22) Filed: Jan. 27, 2005

(65) Prior Publication Data

US 2006/0167667 A1 Jul. 27, 2006

(51) Int. Cl.
*G06F 17/00* (2006.01)
*G06F 17/50* (2006.01)
*G06N 5/00* (2006.01)
*G06G 7/62* (2006.01)
*G05B 13/02* (2006.01)
*G05B 21/00* (2006.01)
*G05B 13/00* (2006.01)
*G05B 15/00* (2006.01)
*G01M 1/38* (2006.01)
*G05D 23/00* (2006.01)

(52) U.S. Cl. ............... 703/13; 706/45; 700/29; 700/275

(58) Field of Classification Search ................ 703/7, 13, 703/83; 700/83
See application file for complete search history.

(56) References Cited

U.S. PATENT DOCUMENTS

| 5,111,413 | A |   | 5/1992  | Lazansky et al.      |
|-----------|---|---|---------|----------------------|
| 5,247,650 | A | * | 9/1993  | Judd et al. ........ 703/20 |
| 5,565,748 | A |   | 10/1996 | Takizawa et al.      |
| 5,680,590 | A |   | 10/1997 | Parti                |
| 5,717,903 | A |   | 2/1998  | Bonola               |

(Continued)

FOREIGN PATENT DOCUMENTS

WO 9810538 3/1998

(Continued)

OTHER PUBLICATIONS

"XML Basics" 1999 by XMLNews.org verified by Wayback Machine http://web.archive.org/web/20000610054430/http://www.xmlnews.org/docs/xml-basics.html.*

(Continued)

*Primary Examiner* — Jeffrey A Gaffin
*Assistant Examiner* — Ben M Rifkin
(74) *Attorney, Agent, or Firm* — Turocy & Watson LLP; R. Scott Speroff; John M. Miller

(57) ABSTRACT

The subject invention relates to integrating agents, control logic, and simulations in order to simulate and validate a control strategy for a physical system. The systems and methods integrate agents and control logic with simulations, and utilize the integrated agents, control logic, and simulations to generate a proxy. The proxy can be employed to couple one or more controllers executing the agents and control logic with the simulations. Visualization is utilized to visualize the simulation, including the agents and the control logic. In addition, the systems and methods utilize a synchronization algorithm to synchronize the execution times of the controllers and the simulations. The foregoing mitigates validation through building and testing physical system and/or test beds. Upon validating control strategies, associated agents and logic can be loaded in one or more industrial controllers controlling the physical system, and the simulation can be utilized to represent the physical system.

32 Claims, 24 Drawing Sheets

U.S. PATENT DOCUMENTS

| | | | |
|---|---|---|---|
| 5,752,008 | A | 5/1998 | Bowling |
| 5,812,826 | A | 9/1998 | McLain, Jr. |
| 5,917,730 | A | 6/1999 | Rittie et al. |
| 6,385,496 | B1 | 5/2002 | Irwin et al. |
| 6,449,715 | B1 | 9/2002 | Krivoshein |
| 6,556,950 | B1 * | 4/2003 | Schwenke et al. ............ 702/183 |
| 6,618,856 | B2 | 9/2003 | Coburn et al. |
| 6,760,630 | B2 | 7/2004 | Turnaus et al. |
| 6,778,863 | B1 | 8/2004 | Lienhard et al. |
| 6,878,560 | B1 | 4/2005 | Rangarajan et al. |
| 6,944,584 | B1 | 9/2005 | Tenney et al. |
| 6,963,814 | B2 | 11/2005 | Jones et al. |
| 7,062,595 | B2 | 6/2006 | Lindsay et al. |
| 7,089,175 | B1 * | 8/2006 | Nemecek et al. ............... 703/28 |
| 7,092,867 | B2 | 8/2006 | Huang et al. |
| 7,110,835 | B2 | 9/2006 | Blevins et al. |
| 7,209,800 | B2 | 4/2007 | Monz et al. |
| 7,209,874 | B2 | 4/2007 | Salmonsen |
| 7,257,523 | B1 | 8/2007 | Nixon et al. |
| 7,283,934 | B2 | 10/2007 | Deller et al. |
| 7,286,975 | B2 | 10/2007 | Abowd et al. |
| 7,395,130 | B2 | 7/2008 | Toyoshima et al. |
| 7,424,329 | B2 | 9/2008 | McKelvey et al. |
| 7,424,416 | B1 | 9/2008 | Cavanagh et al. |
| 7,447,622 | B2 | 11/2008 | Arama et al. |
| 7,457,736 | B2 | 11/2008 | Chang |
| 7,464,132 | B1 | 12/2008 | Florissi et al. |
| 7,472,055 | B2 | 12/2008 | Garcia et al. |
| 7,480,609 | B1 | 1/2009 | Cavanagh et al. |
| 7,480,709 | B2 | 1/2009 | Callaghan |
| 7,493,236 | B1 | 2/2009 | Mock et al. |
| 7,543,281 | B2 | 6/2009 | King et al. |
| 7,765,095 | B1 * | 7/2010 | Nemecek ......................... 703/26 |
| 2002/0015042 | A1 | 2/2002 | Robotham et al. |
| 2002/0147505 | A1 | 10/2002 | Beck et al. |
| 2003/0034998 | A1 | 2/2003 | Kodosky et al. |
| 2003/0061004 | A1 | 3/2003 | Discenzo |
| 2003/0079207 | A1 | 4/2003 | Xavier et al. |
| 2003/0084010 | A1 | 5/2003 | Bigus et al. |
| 2003/0101025 | A1 | 5/2003 | Shah et al. |
| 2003/0105761 | A1 | 6/2003 | Lagerman |
| 2003/0125844 | A1 | 7/2003 | Foertsch et al. |
| 2003/0130834 | A1 | 7/2003 | Krishnan |
| 2003/0182638 | A1 | 9/2003 | Gupta et al. |
| 2003/0222819 | A1 | 12/2003 | Karr et al. |
| 2004/0059442 | A1 | 3/2004 | Birkelbach et al. |
| 2004/0064253 | A1 | 4/2004 | Brayton et al. |
| 2004/0111700 | A1 | 6/2004 | Colombo |
| 2004/0186697 | A1 | 9/2004 | Schreier et al. |
| 2004/0204772 | A1 * | 10/2004 | Maturana et al. ................. 700/2 |
| 2004/0250168 | A1 * | 12/2004 | Tichy et al. ..................... 714/38 |
| 2005/0159932 | A1 * | 7/2005 | Thurner ............................ 703/2 |
| 2007/0192082 | A1 | 8/2007 | Gaos et al. |
| 2008/0162104 | A1 | 7/2008 | Onishi et al. |
| 2008/0189677 | A1 | 8/2008 | Cote et al. |
| 2008/0270105 | A1 | 10/2008 | Poplack et al. |
| 2008/0300698 | A1 | 12/2008 | Havekost et al. |

FOREIGN PATENT DOCUMENTS

WO 20040066200 8/2004

OTHER PUBLICATIONS

"Technical Notes: OPC (Open Process Control)" Microlink Engineering Solutions. 2002, verified by Wayback Machine. http://web.archive.org/web/20021004042521/http://www.microlink.co.uk/opc.html.*

A. M. Wildberger, "Complex Adaptive Systems: Concepts and Power Industry Applications", IEEE Control Systems Magazine, Dec. 1997, pp. 77-88, vol. 17, No. 6.

J. Budenske, et al. "Agent-based schedule validation and verification", 2001 IEEE International Conference on Systems Man and Cybernetics, Oct. 7, 2001, pp. 616-621, vol. 1 of 5, New York, NY.

European Search Report dated Jun. 2, 2006 for European Patent Application Serial No. 06 00 1739, 3 pages.

J Q Feng, et al., "A multi-agent based intelligent monitoring system for power transformers in distributed substations", Power System Technology Proceedings, 2002 IEEE International Conference, Oct. 13, 2002, pp. 1962-1965, vol. 3, Piscataway, NJ.

European Search Report dated Jul. 17, 2006 for European Patent Application Serial No. 05 02 4997, 6 pages.

"Decision Making Agents in Manufacturing Systems Simulations: Examples"; Nadoli, Gajanana; Biegel, John E., International Conference on Systems, Man, and Cybernetics Decision Aiding for Complex System, (1991), IEEE, vol. 1, pp. 411-416.

"Intelligent agents in simulation of manufacturing systems"; Nadoli, Gajanana; Biegel, John, Proceedings of the Eastern Multi-Conference on AI and Simulation, (1989), Society for Computer Simulation International, pp. 118-123.

Final OA mailed Apr. 3, 2009 for U.S. Appl. No. 11/043,013, 33 pages.

OA mailed Apr. 29, 2009 for U.S. Appl. No. 11/043,013, 41 pages.

Office Action dated Apr. 29, 2009 for U.S. Appl. No. 11/043,013, 41 pages.

Final OA mailed Oct. 29, 2009 for U.S. Appl. No. 11/043,013, 42 pages.

OA dated Oct. 4, 2010 for U.S. Appl. No. 11/043,013, 55 pages.

* cited by examiner

AGENT SIMULATION DEVELOPMENT ENVIRONMENT

RELATED APPLICATIONS

This application is related to co-pending U.S. patent application Ser. No. 11,043,013 filed on Jan. 24, 2005 and entitled "UNIVERSAL RUN-TIME INTERFACE FOR AGENT-BASED SIMULATION AND CONTROL SYSTEMS."

TECHNICAL FIELD

The present invention generally relates to industrial control systems, and more particularly, to systems and methods that facilitate simulation and validation of control strategies.

BACKGROUND OF THE INVENTION

Automation and manufacturing industries have evolved into members of a global economy in which formation of strategic partnerships amongst companies and associated components has become increasingly more important. Traditional, centralized, sequential information-processing methodologies commonly no longer meet the demands of rapidly changing manufacturing environments. The ability of an organization to quickly respond to changes and maintain productivity is increasingly limited by its information processing capabilities. Evolving distributed organizations promise high decentralization of operations. In such organizations, there are neither predefined hierarchies nor rigid structures. Instead, the organization emerges as a result of dynamic interactions of its intelligent components. Supporting infrastructures should be capable of providing timely communication and accessible resources based on the needs of an emergent organization. Constraints and information should be efficiently propagated throughout the system using mechanisms that do not fracture the enterprise. A collaborative intelligent architecture is required to enable real-time evaluation of tasks, wherein each member of the collaboration environment must adapt to the needs and regulations of its partners.

The automation and manufacturing industries commonly utilize industrial controllers to control systems therein. In general, industrial controllers are special purpose processing devices used for controlling (e.g., automated and semi-automated) industrial processes, machines, manufacturing equipment, plants, and the like. A typical controller executes a control program or routine in order to measure one or more process variables or inputs representative of the status of a controlled process and/or effectuate outputs associated with control of the process. Such inputs and outputs can be digital and/or analog, assuming a continuous range of values. A typical control routine can be created in a controller configuration environment that has various tools and interfaces whereby a developer can construct and implement a control strategy using industrial and conventional programming languages or graphical representations of control functionality. Such control routine can be downloaded from the configuration system into one or more controllers for implementation of the control strategy in controlling a process or machine.

Measured inputs received from a controlled process and outputs transmitted to the process can pass through one or more input/output (I/O) modules in a control system. Such modules can serve in the capacity of an electrical interface between the controller and the controlled process and can be located local or remote from the controller. Inputs and outputs can be recorded in an I/O memory. The input values can be asynchronously or synchronously read from the controlled process by one or more input modules and output values can be written directly to memory by a processor for subsequent communication to the process by specialized communications circuitry. An output module can interface directly with a controlled process by providing an output from memory to an actuator such as a motor, drive, valve, solenoid, and the like.

In distributed control systems, controller hardware configuration can be facilitated by separating the industrial controller into a number of control elements, each of which performs a different function. Particular control modules needed for the control task can then be connected together on a common backplane within a rack and/or through a network or other communications medium. The control modules can include processors, power supplies, network communication modules, and I/O modules exchanging input and output signals directly with the controlled process. Data can be exchanged between modules using a backplane communications bus, which can be serial or parallel, or via a network. In addition to performing I/O operations based solely on network communications, smart modules exist which can execute autonomous logical or other control programs or routines. Various control modules of a distributed industrial control system can be spatially distributed along a common communication link in several locations. Certain I/O modules can thus be located proximate a portion of the controlled equipment, and away from the controller. Data can be communicated with these remote modules over a common communication link, or network, wherein all modules on the network communicate via standard communication protocols.

Intelligent agent technology can be utilized in connection with industrial controllers to render highly decentralized, distributed, robust and flexible control of systems. In such systems, the intelligent agents can execute within industrial controllers along with control routines. Such systems can be considered a community of integrated (e.g., via plug-and-play) autonomous and efficiently cooperating units, or agents. The agents are autonomous in the sense that they independently make local decisions. Although autonomous, such agents also cooperate with each other to achieve global-level goals. Unlike classical control systems that have a centralized control system, the autonomous agent-based technique does not utilize a central control element to affect the behavior of any agent. For example, there is no control element that would be aware of all the particular states or patterns of behavior of the overall system. The overall behavior of such a system emerges from asynchronously executed decision-making processes of particular agents and from dynamically changing patterns of inter-agent interactions.

Conventional techniques utilized to validate control strategies for such agent-based systems typically utilize experimental testing with a physical target system prior to commissioning a solution for deployment. Such testing can be relatively expensive and time intensive and, for certain applications, not realistic. In addition, modifying such systems (agents, control routines and/or the physical system) and/or injecting error conditions may require new software, builds and reloads and re-design of the physical target system, leading to further costs and time consumption.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

Agent-based technology can be utilized within the automation and manufacturing environments to render highly distributed, robust and flexible control of agent-based control systems. However, testing physical systems can be expensive and time intensive, and sometimes unavailable as an option. To validate task sequences and interactions of the agents, it is required to understand the agent context from multiple views. Novel aspects described herein integrate the pieces of the organization from the device level into upper enterprise levels through a validation system that allows intelligent agent designers to feasibility verify agents' actions prior to commissioning a system for deployment. This can improve design and performance of agent-based organization. Agent behavior can be refined exhaustively prior to its final deployment, without ad-hoc investments or complicated equipment in-the-loop. Such infrastructure can be synchronized with controllers to mimic real-time operations in order to obtain good representations of events occurring in the real world. The subject invention can mitigate the burden associated with designing, implementing and validating the control solution by several factors, or orders of magnitude, which can reduce costs associated with experimental testing of physical systems and can enable a dynamic and comprehensive analysis of a system.

In accordance with an aspect of the invention, a system that integrates intelligent agents, control logic and/or simulations to facilitate simulating and validating an industrial control strategy is provided. The system of an interface component that provides adapters, connectors, interfaces, channels, etc. various entities (virtual and/or physical) that collectively can form a plant (virtual and/or physical) and associated control. Such entities can include intelligent agents, control logic and simulations, as well as visualization, soft and/or hard industrial controllers, human machine interfaces (HMIs), development environments, graphical user interfaces, application programming interfaces, and/or physical machines, apparatuses, processes, equipment, etc. The interface component can mitigate costs and inefficiencies associated with conventional techniques of building full or scaled-down test beds by providing a common interface in which the agents, the control logic, the simulation, etc. can dynamically and seamlessly interact. Simulation and validation can include analyzing agents and/or devices (e.g., machine, apparatus . . . ) behavior, comparing control scenarios, introducing anomalies, observing system responses, dynamically modifying any or all of the agents, the control logic, the simulations, etc., automatically updating relationships, etc.

The system can receive the agents and control logic in their respective native languages and/or in various other formats such as markup, C-based, etc. languages. In addition, the agents and control logic can be combined prior to being received by the interface component. In one instance, agent and control logic can be combined in an XML file and provided to the interface component. In addition, a tag mapping scheme can be provided to the interface component. The tag mapping scheme can be utilized by the interface component to map the agents and control logic to a simulation. Such mapping can include merging the agent and control logic tags in the simulation. The simulation with the agent and control logic tags can be provided to the interface component, which can be utilized to generate a proxy between controllers executing the agents and control logic, and the simulation. The proxy can provide suitable connectors for interoperability. The system further includes a component that synchronizes controller and simulation execution. This component can initiate a data exchange and determine execution times of the controller and simulation. An algorithm can then be employed such that the simulation and controller execution begin and end times are synchronized.

Agents and control logic associated with validated control strategies can be loaded to soft and/or hard controllers utilized in connection with controlling physical systems. In addition, validated simulations can be utilized to build such physical systems. The integration component can be utilized in connection with the physical systems to dynamically and seamlessly simulate and validate control strategy variations, observe system responses to particular events, etc. Agents, control and simulation can be integrated through a generic agent/control/simulation ontology, which can be expressed in the form of a XML tree. The generic ontology can be developed in compliance (or leading) with simulation interoperability standards such as in connection with the Simulation Interoperability Standards Organization (SISO) to enable global usability and interoperability.

In accordance with other aspects of the subject invention, various methods that facilitate simulating and validating control strategies are provided. Similar to the systems, the methods provide for developing agents, control logic and simulations and coupling such entities through a common interface in order to simulate and validate control strategies. Furthermore, various exemplary diagrams for registering entities and synchronizing controllers and simulation are also provided. Moreover, exemplary user interfaces that facilitate simulation and validation are provided.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
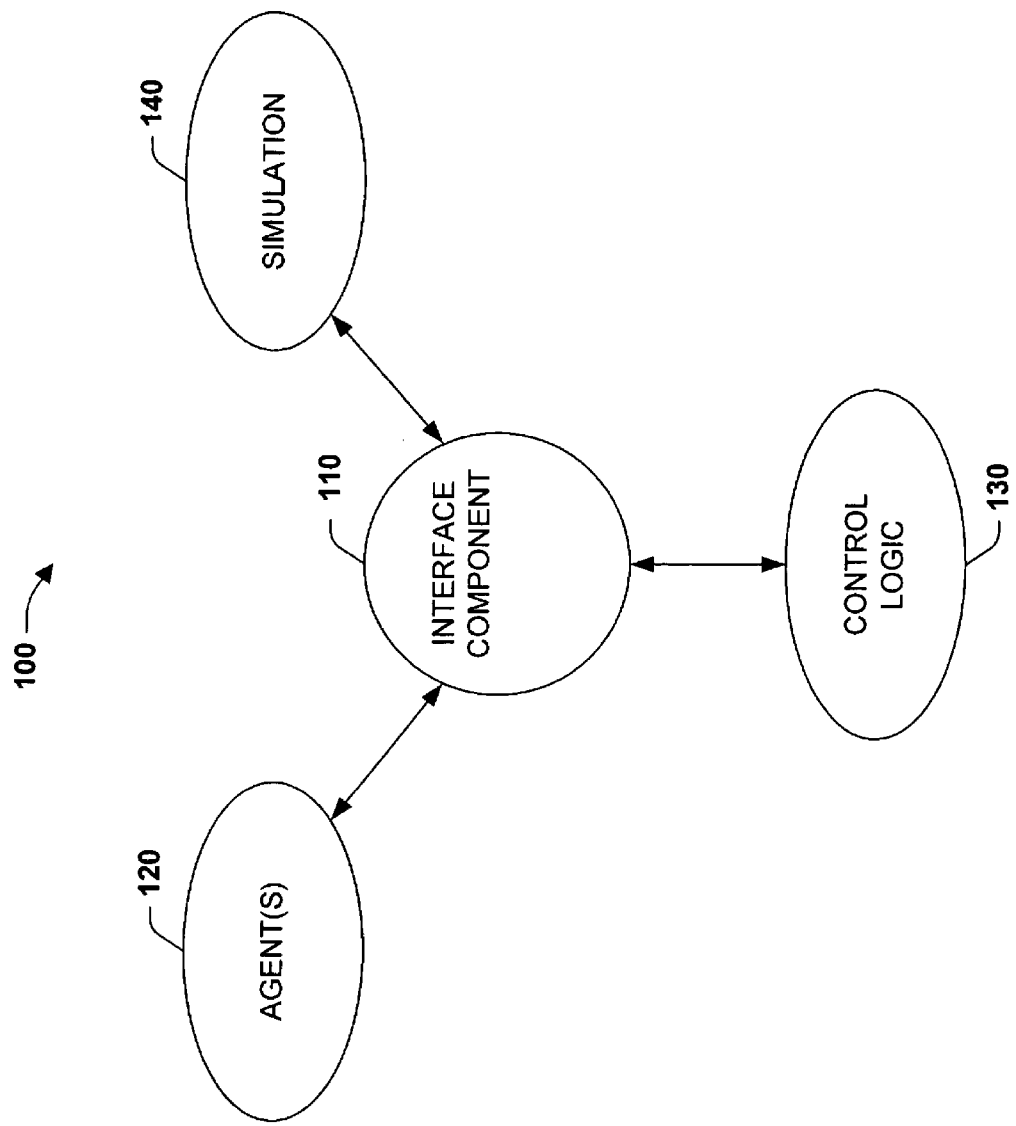
FIG. 1 illustrates an exemplary system that integrates intelligent agents, control logic and/or simulations to facilitate simulating and validating an industrial control strategy

The subject invention relates to simulating and validating industrial control solutions in industrial automation environments. The systems and methods integrate agents and control logic with simulations, and utilize the integrated agents, control logic and simulations to generate a proxy. The proxy can be employed to couple one or more controllers executing the agents and control logic with the simulations. In addition, the systems and methods utilize a synchronization algorithm to synchronize the execution times of the controllers and the simulations. The foregoing mitigates validation through building and testing physical system and/or test beds.

Terms such as "component," "controllers," "PLCs," "agents," "simulation," "control logic," and variations thereof are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program, a computer, and an industrial controller. By way of illustration, both an application running on a server and the server can be components. One or more components may reside within a process and/or thread of execution and a component may be localized on one computer and/or distributed between two or more computers (e.g., via data packets and signals between the computers), industrial controllers, and/or modules communicating therewith.

The subject invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that integrates intelligent agents, control logic and/or simulations to facilitate simulating and validating an industrial control strategy. The system of 100 includes an interface component 110 that provides adapters, connectors, interfaces, channels, etc. various entities (virtual and/or physical) that collectively can form a plant (virtual and/or physical) and associated control. As depicted in FIG. 1, such entities can include intelligent agents 120, control logic 130 and simulations 140. It is to be understood that the interface component 110 can also provide adapters, connectors, interfaces, channels, etc. to other entities such as visualization, soft and/or hard industrial controllers, human machine interfaces (HMIs), development environments, graphical user interfaces, application programming interfaces, and/or physical machines, apparatuses, processes, equipment, etc. The interface component 110 can bridge such entities together. In this respect, the interface component 110 can be considered a common input/output (I/O) for these entities. In general, the control logic 130 and the agents 120 work together to control physical systems, etc. and/or representations thereof, while the simulation 140 is utilized to represent the physical systems, etc.

Conventionally, validation of systems that employ the aforementioned entities is achieved through building physical prototypes and/or physical scaled down models of physical systems and testing the prototypes and/or physical models. Such techniques can be a relatively costly and inefficient. In addition, changes thereto can require tearing down and building new physical prototypes and/or physical models. An alternative approach is to simulate the physical system. However, entities such as the intelligent agents 120, the control logic 130 and the simulations 140 traditionally reside in different domains that do not communicate with one another. For example, agent design typically is based on protocols such as FIPA interaction protocols, ContractNet, etc., which can be utilized to create and coordinate agent activities throughout logical links. Agents can interact with one another within and/or outside of a controller through Job Description Language (JDL), which is employed by the agents to represent planning, commitment, and execution phases during task negotiation. Agents can emit messages outside their domain through wrapping JDL message inside FIPA envelopes.

Control logic is typically programmed in industrial languages such as structured text (ST), sequential function chart (SFC), functional block diagram (FBD), instruction list (IL), and ladder diagram (LD), as well as other languages like C, C++, C#, Graphical Motion Language (GML), markup language, Java, Flow-Charts, etc. Such programs or routines are executed by an industrial controller to measure one or more process variables or inputs representative of the status of a controlled process and/or effectuate outputs associated with control of the process. A typical control routine is created in a controller configuration environment that has various tools and interfaces. Simulations commonly are generated through off-the-shelf simulation packages. Such packages generally provide platforms for multi-domain simulation and model-based design of dynamic systems, including interactive graphical environments and customizable sets of libraries for testing behavior and control. Example of a simulation package that can be utilized in accordance with aspects of the subject invention include, but are not limited to, Simulink, Arena, 20-sim, LabVIEW, VisSim, ACSL, and Easy5, which provide for modeling, simulating and/or analyzing systems. Each of these typically includes a customized syntax. The current invention can provide flexible I/O symbol (e.g., tags) manipulation through import, export, and mapping features to link data between control, agents and/or simulation.

The interface component 110 can mitigate costs and inefficiencies associated with conventional techniques of building full or scaled-down test beds by providing a common interface in which the agents 120, the control logic 130 and the simulation 140 can dynamically and seamlessly interact. By way of example, the interface component 110 bridges the various domains to enable the agents 120, the control logic 130 and/or the simulations 140 to interact to simulate a plant under control of various control strategies. Simulation can include analyzing agents and/or devices (e.g., machine, apparatus . . . ) behavior, comparing control scenarios, introducing anomalies, observing system responses, dynamically modifying any or all of the agents 120, the control logic 130 and the simulations 140, automatically updating relationships, etc.

Figure 2:
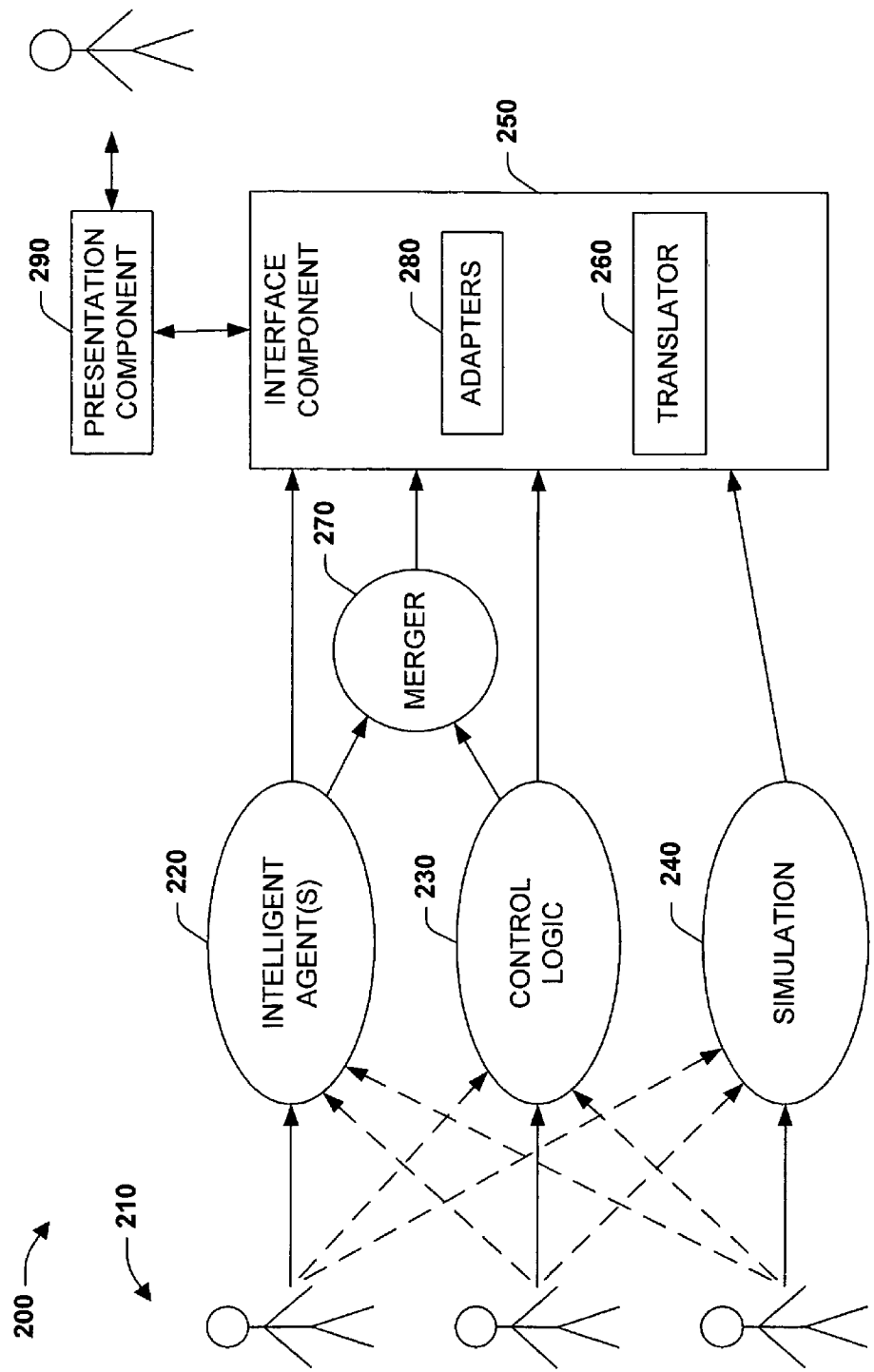
FIG. 2 illustrates an exemplary system that facilitates visualization of integrated an agents, control logic and simulation for simulation and validation of a control solution.

FIG. 2 illustrates a system 200 that facilitates visualization of integrated agents, control logic, simulation, and validation. As depicted, one or more users 210 (e.g., control's engineer, systems engineer . . . ) can generate one or more intelligent agents 220, control logic 230 (e.g., routines, programs, code . . . ), and/or simulations 240. As noted in connection with system 100 of FIG. 1, protocols such as FIPA interaction protocols, ACS/JDL, ContractNet, and the like can be utilized to create and coordinate agent activities, and JDL can be utilized to represent planning, commitment, and execution phases during task negotiation; control routines can be programmed in various languages such as ST, SFC, FBD, IL, LD, C, C++, C#, GML, XML, HTML, Java, Flow-Charts, and the like, wherein such programs can receive inputs (e.g., state changes, measured values . . . ) and/or effectuate control; and simulations can be created with off-the-shelf simulation packages and/or proprietary programs.

For simulation and validation purposes, the one or more intelligent agents 220, control logic 230, and/or a simulation 240 can be connected through an interface component 250. Various techniques can be utilized to couple these with the interface component 250. For example, the interface component 250 can be part of a simulation development environment wherein the one or more intelligent agents 220, control logic 230, and/or a simulation 240 can be imported, uploaded, read, etc. from hard drive, CD, DVD, floppy disc, Optical disk, tape, memory stick, Flash memory, cache, and/or other storage components, including both volatile and non volatile. In addition, the one or more intelligent agents 220, control logic 230, and/or a simulation 240 can be provided to the interface component 250 through various networks including Large Area Networks (LAN), Wide Area Network (WAN), Storage Area Networks (SAN), Network Attached Storage (NAS), server farms, databases, an intranet, the Internet, client/server, peer-to-peer, multi-tier architecture, etc. Such networks can be built upon various topologies such as bus, star, ring, grid, tree, etc. client/server . . . ), etc.

Before, during and/or after the interface component 250 obtains the one or more intelligent agents 220, control logic 230, and/or a simulation 240, these entities can be converted, transformed, mapped, etc. into a suitable and/or common format. In another instance, interface component 250 can provide on-the-fly translation such that it appears a common and/or universal syntax, semantics, linguistics, etc. is utilized across these entities. This translation can be performed by a translator component 260 ("translator 260"). In yet another instance, the one or more intelligent agents 220, control logic 230, and/or a simulation 240 can be combined. For example, an agreed upon set of rules, symbols, tags and/or naming nomenclature can be utilized during development of these entities such that a mapping can be performed, wherein the one or more intelligent agents 220, control logic 230, and/or a simulation 240 operated together (e.g., are combined together). For example, the agents 220 and control logic 230 can be mapped to corresponding components within the simulation 240, wherein the simulation can be subsequently executed under the control of the agents 220 and control logic 230. These approaches can provide a technique that facilitates forming interoperable distributed systems for simulation. Furthermore, these approaches can spawn and/or be developed in conformance with simulation interoperability standards such as, for example, in connection with the Simulation Interoperability Standards Organization (SISO) to enable global usability and interoperability. The foregoing can provide a link between high level and low level agents and control. In addition, this approach can be utilized as or to develop a SISO specification.

As noted, the one or more intelligent agents 220, control logic 230, and/or a simulation 240 can be combined prior to being received by the interface component 250. It is to be appreciated that such combining can include any and/or all of the one or more intelligent agents 220, control logic 230, and/or a simulation 240. As depicted, the one or more intelligent agents 230 and control logic 240 can be directly provided to the interface component 250 and/or combined by a merger component 270 ("merger 270") prior to being integrated with the simulation 240 by the integration component 250. Optionally, the merger can occur within the interface component 250. It is to be appreciated that the combined agents 220 and control logic 230 can be formatted in markup, C based, etc. languages. Typically, the agents 220 and the control logic 230 execute in conjunction to control a system, etc. The interface component 250 can further include an adapter component 280 ("adapters 280") that provides various protocols for interacting with systems to obtain the one or more intelligent agents 220, control logic 230, and/or a simulation 240. For example, the adapters 280 can include one or more connections to exchange, read, write, execute, etc. to modeling, simulating and/or analyzing tools such as Simulink, Arena, LabVIEW, SPICE, ACSL, AnyLogic, ad-hoc tools and/or the like.

As previously discussed, the interface components described herein can provide adapters, connectors, interfaces, channels, etc. to entities other then agents, control and simulation, for example, entities such as visualization, soft and/or hard industrial controllers, development environments, graphical user interfaces, application programming interfaces, and/or physical machines, apparatuses, processes, equipment, etc. The system 200 further includes a presentation component 290. As depicted, the presentation component 290 is a separate entity; however, it is to be appreciated that the presentation component 290 can be part of the interface component 250 and/or a simulation development environment. In addition, more than one presentation component 290 can be utilized in accordance with aspects of the subject invention.

The presentation component 290 can provide various types of user interfaces. For example, the presentation component 290 can provide a graphical user interface (GUI), a command line interface, and the like. For example, a GUI can be rendered that provides a user with a region or means to load, import, read, etc. the one or more intelligent agents 220, control logic 230, and/or a simulation 240, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with the one or more intelligent agents 220, control logic 230, and/or a simulation 240 via entering the information into an edit control.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the invention is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 3:
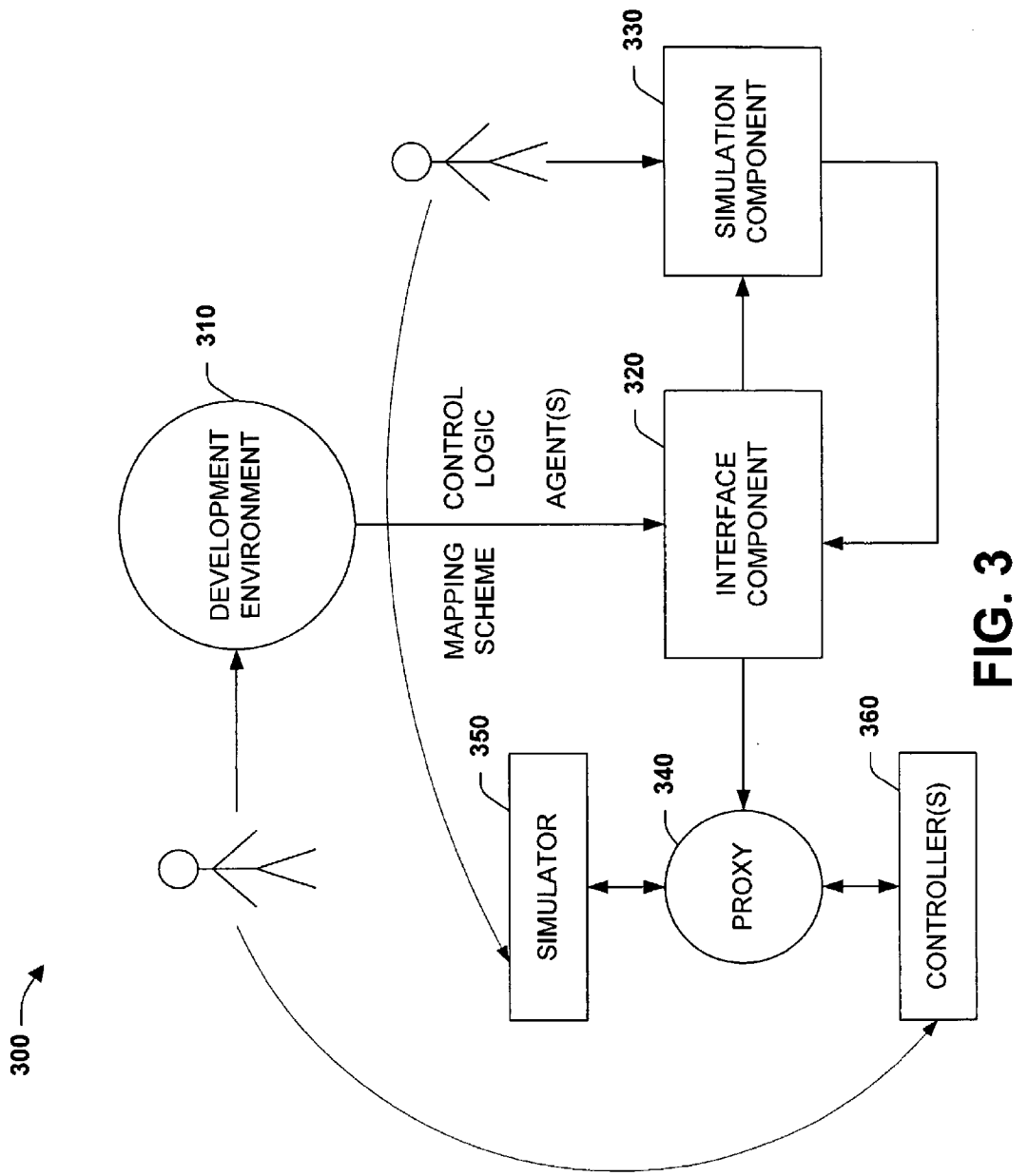
FIG. 3 illustrates an exemplary system that integrates agents, control logic and simulation through mapping agent and control tags with simulation tags

FIG. 3 illustrates a system 300 that integrates agents, control logic and simulation to facilitate simulating and validating an industrial control solution. A developer(s) can employ a development environment 310 (e.g., industrial control, software . . . ) to generate intelligent agents and control logic, which can be conveyed along with an associated mapping scheme to an interface component 320. The intelligent agents and control logic can be serially and/or concurrently conveyed to the interface component 320. In one instance, the agents and control logic are conveyed to the interface component 320 in their native respective native languages. In another instance, the agents and control logic are converted to suitable language (e.g., XML, HTML, XTML . . . ) and then conveyed to the interface component 320. In yet another instance, the intelligent agents and control logic are formatted in a markup, C and/or other language and then conveyed to the interface component 320. In addition, a mapping scheme such common rules, symbols, tags, indicia, nomenclature, naming convention, etc. . . . ) can be conveyed from the development environment to the interface component 320. Such scheme can be utilized to map between tags associated with agents, control logic and/or simulation.

The above-noted developer and/or other developer can employ a simulation component 330 to generate one or more simulations of one or more plants, manufacturing processes, ship cooling systems (e.g., chillers . . . ), etc. As noted above, suitable simulation tools include, but are not limited to, Simulink, Arena, LabVIEW, SPICE, ACSL, AnyLogic, ad-hoc and/or the like. The interface component 230 can employ the mapping scheme to automatically map between the agents and control logic, and any generated simulations. In addition or alternatively, these mapping schemes can be manually mapped, re-mapped, deleted, modified, imported, exported, etc. Moreover, new symbols, tags, etc. can be created mapped between the agents and control logic, and simulations. The generated simulations, with or without mapped agent and/or control symbols, tags, etc. can be conveyed to the interface component 320, wherein the symbols, tags, etc. are re-absorbed. The interface component 320 can employ the agent, control logic and/or simulation information to generate a proxy 340 between a simulator 350 and a controller 360. For example, the agent, control logic and/or simulation information can be utilized to create an association list, which can be utilized to facilitate generating the proxy 340.

The proxy 340 can be utilized to facilitate simulating and validating a control strategy. For example, the simulation with mapped agent and control logic symbols, tags, etc. can be executed, wherein the simulated system operates under the control of the agents and control logic. As depicted, the agents and control logic provided to the interface component 320 can also be provided to the controller 360, and the simulation(s) can also be provided to the simulator 350. It is to be appreciated that this approach to simulation and validation can mitigate costs and inefficiencies associated with conventional techniques of building full or scaled-down test beds by providing a common interface in which agents, control logic and simulation can dynamically and seamlessly interact. Conventional validation of such systems typically includes at least a portion of a physical prototype and/or physical scaled down models of the physical system. Such techniques can be a relatively costly and inefficient. In addition, changes thereto can require tearing down and building new physical prototypes and/or physical models.

It is to be appreciated that the developers can modify the agents, control logic and/or simulation and dynamically update the simulation and validation. This is facilitated through the common mapping scheme utilized to develop the agents, control logic and simulations. In addition, agents and/or control logic can be seamlessly conveyed to one or more soft and/or hard controllers and executed therein and simulation and validation can continue. Moreover, the simulation can be implemented to build the physical system, and simulation and validation can seamlessly continue as a user toggles between the simulated and real system.

Figure 4:
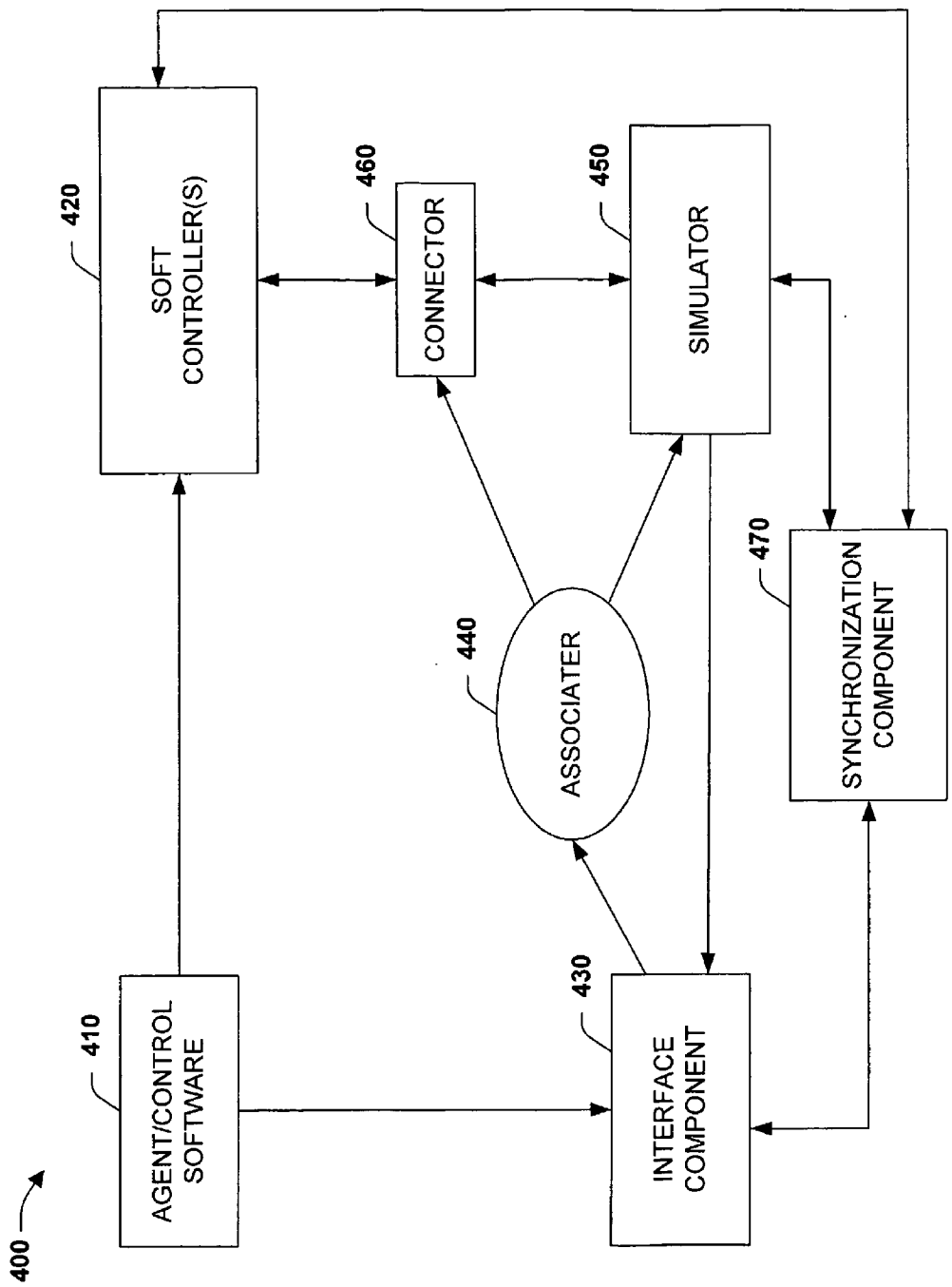
FIG. 4 illustrates an exemplary system that synchronizes simulation and controllers for simulation and validation.

FIG. 4 illustrates a system 400 that integrates agents/control software with a simulation(s) to facilitate simulating and validating an industrial control strategy. The system includes agent/control software 410, which can be loaded on software controllers 420 that can be utilized for simulation and/or validation purposes. The agent/control software 410 can also be provided to interface component 430, which facilitates integrating agents, control logic and/or simulations for simulation and/or validation purposes. It is to be appreciated that the agent/controller software 410 can be provided to the interface component 430 in an XML, an HTML, an XTML, an HTTP, an HTTPS, and the like based format.

The interface component 430 can utilize an associater component 440 ("associater 440") to create a symbolic association between the agent/control software 420 and a simulation 450. Such symbolic association can include a mapping between tags, a merger of agent/control tags with simulation tags, etc. The simulation 450 with mapped agent/control tags can be provided to the interface component 430, which can invoke the associater 440 to generate a symbolic association that facilitates communication between the soft controller 420 and the simulation 450. For example, the associater 440 can create a connector 460 that facilitates communication between the soft controller 420 and the simulation 450. The connector 460 can be utilized to facilitate simulation and validation of a control plan via the soft controller 420 and the simulation 450. In accordance with various aspects of the subject invention, the connector 460 can include an Open Process Control (OPC) based or other connector employed to facilitate interoperability in the automation domain.

The system 400 further includes a synchronization component 470 that synchronizes events between the soft controllers 420 and the simulation 450. It is to be understood that the technique employed is illustrative and does not limit the invention. Various other synchronization techniques, including known techniques, can be employed in accordance with aspects of the subject invention. The synchronization component 450 can perform a pre-simulation and validation routine to synchronize the controller 420 and the simulation 470. Such routine can include invoking a data exchange in any of the controllers 420 and the simulations executed by the simulators 450. From this data exchange, the synchronization component 450 can determine execution times. This information can be utilized in connection with an algorithm that determines execution times adjustments such that the simulations and the controllers 420 are synchronized. In one aspects of the invention, such synchronization means that the simulations and the controller 420 start and end data exchanges at substantially the same time. Such synchronization typically is needed since soft controllers 420 as well as other computer based systems do not necessarily execute in real-time. For example, a computer implemented simulation of a physical system can execute in a fraction of the time it takes the physical system. For instance, the computer implemented simulation can simulate in micro-seconds a process that physically takes hours, days, or longer. In general, the actual simulation time depends on the operating systems, processor, memory, etc.

Figure 5:
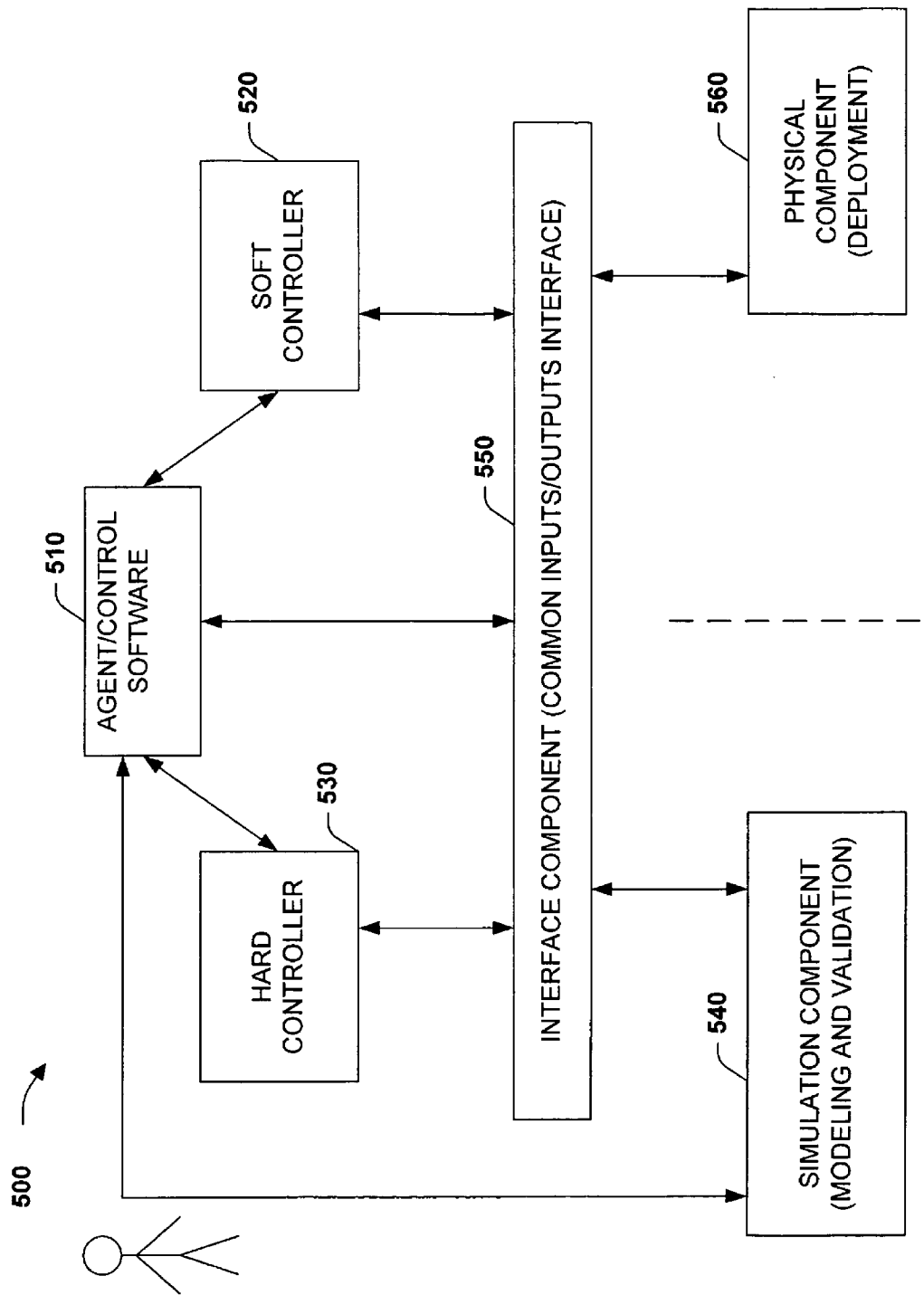
FIG. 5 illustrates an exemplary system for simulating, validating, implementing and modifying a control strategy through integrated simulation and validation.

FIG. 5 illustrates a system 500 that integrates simulation and physical systems for control solution simulation and validation. The system includes agent/control software 510, which comprises one or more intelligent agents and various control logic. It is to be appreciated that the agent/control logic 510 can be provided to other components of the system 500 in respective native languages and/or any suitable language such a markup language (e.g., XML . . . ), a C based language, etc. As depicted, the agent/control software 510 can be provided to a soft controller 520, a hard controller 530, directly to a simulation 540, indirectly to the simulation component 540 through an interface component 550, and a physical system 560 through the interface component 550.

As described in the preceding figures, the agent/control software 510, the soft controller 520, and the simulation component 540 can be utilized to simulate and validate a control strategy without having to build physical systems through the interface component 550, which provides a common interface amongst these entities. However, it is to be appreciated that the interface component 550 can be utilized to facilitate simulation and validation of a control strategy via any combination of the entities depicted in FIG. 5. For example, the agent/control software 510 can be loaded to the hard controller 530 and simulation and validation can be achieved utilizing the simulation component 540 and/or the physical system 560, wherein the interface component 550 facilitates interaction between these components. In another example, the agent/control software 510 can be loaded to the soft controller 520 and simulation and validation can be achieved utilizing the physical system 560, wherein the interface component 550 facilitates interaction between these components. In yet another example, simulation and validation can be achieved through a combination of the above examples.

In accordance with another aspect of the invention, a validated control strategy can be implemented by loading the agent/control software 510 into the soft controller 520 and/or the hard controller 530 and building a physical system based on the control strategy and/or simulation. It is to be appreciated that at any time, the control strategy of any physical system can be simulated and the simulation along with associated control/agent software 510 can be utilized to simulate and validate any changes.

The following illustrates an exemplary markup language based mapping for the agents, control logic, and simulation. It is to be appreciated that this example is illustrative and does not limit the invention.

```
<System name="<System>">
    <Controllers>
        <Controller name="<Controller_1>" location="1"
        enetipaddress="<IP Address>"
motion="0"/>
        <Controller name="<Controller_2>" location="2"
        enetipaddress="<IP Address>"
motion="0"/>
        .
        .
        .
    </Controllers>
    <Tags>
        <TAG name="Event" host="Controller_1" access="r"
        type="boolean" value="0"/>
        <TAG name="EventAck" host=" Controller_1" access="r"
        type="boolean"
value="0"/>
        <TAG name="EventFail" host=" Controller_1" access="r"
        type="boolean"
value="0"/>
        .
        .
        .
    </Tags>
    <Components>
        <Component name="Combat">
        <Tags>
        <TAG name="Active" host=" Controller_1" access="r"
        type="boolean" value="0"/>
        <TAG name="CICsActive" host=" Controller_1" access="r"
        type="boolean"
value="0"/>
        <TAG name="RequiredActive" host=" Controller_1" access="r"
        type="boolean"
value="0"/>
        .
        .
        .
```

FIGS. 6-9 illustrate methodologies, in accordance with an aspect of the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

Figure 6:
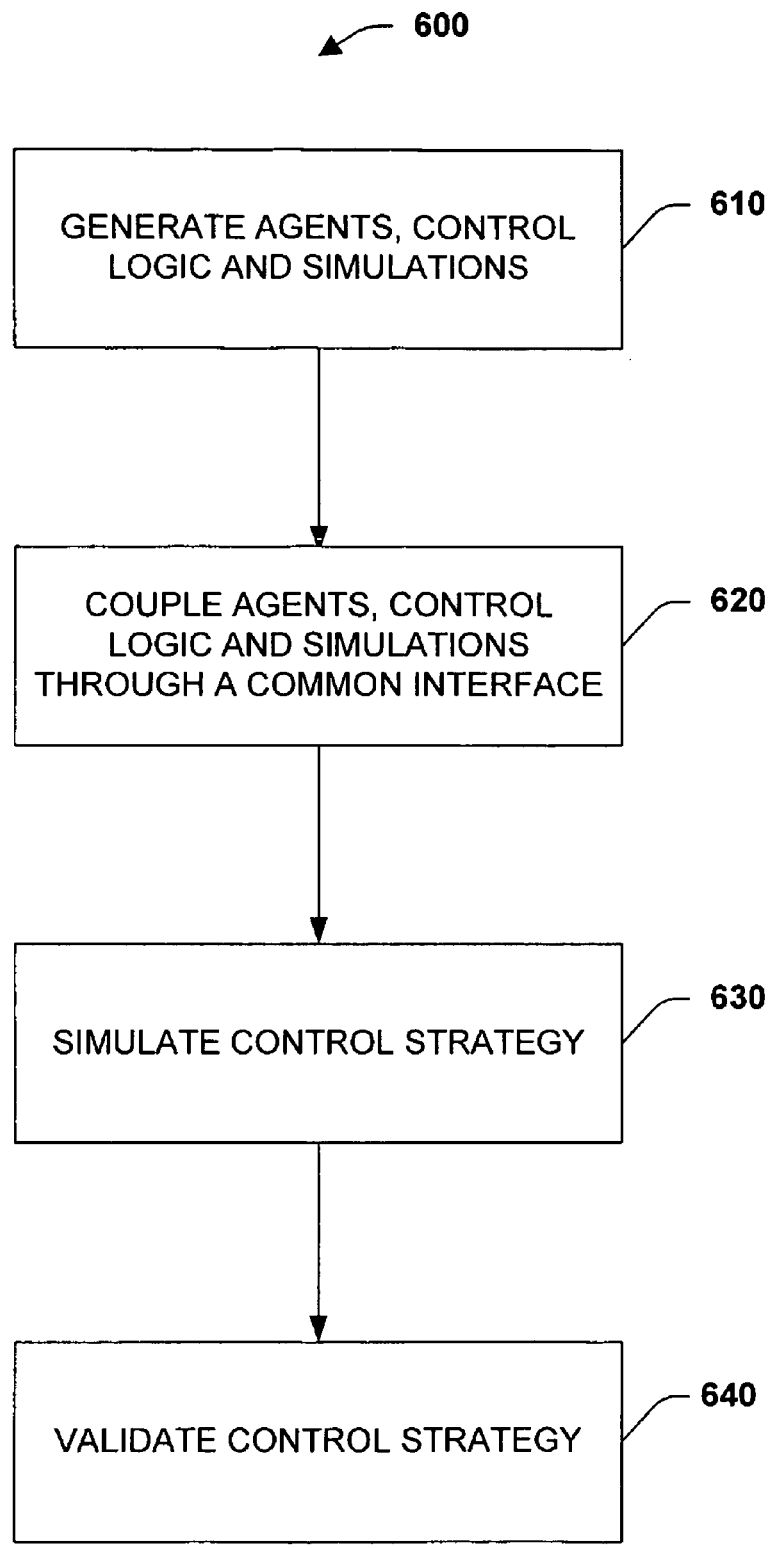
FIG. 6 illustrates an exemplary method for integrating intelligent agents, control logic and simulation in order to simulate and validate a control strategy.

FIG. 6 illustrates a methodology 600 that integrates intelligent agents, control logic and simulation in order to simulate and validate a control strategy. At reference numeral 610, one or more agents, sets of control logic and simulations are generated. This can be achieved by one or more developers. For example, a system's engineer can generate the simulation, and an agent and control developer can create the agents and control logic, respectively, based on the simulated system. In another example, the same developer can generate the agents, control logic and simulations. In yet another example, one or more developers can contribute to development of any or all of the agents, control logic and simulations. At referenced numeral 620, the agents, control logic and simulations can be coupled through a common interface that integrates the agents, control logic and simulations within a similar environment. Conventionally, these entities reside in disparate domains and are not capable of interaction with each other.

At 630, the agents, control logic and simulations are concurrently utilized to simulate the system and control thereof. Such simulation includes simulating behaviors, control, error recovery, conflict resolution, etc. In addition, the user can introduce anomalies into the simulation such as disconnecting and/or changing paths, overloading, changing control schemes, etc. Moreover, the user can change any of the agents, control logic and/or simulation. At 640, the control system is validated. Upon validation, the agents and/or control logic can be loaded to soft and/or hard controllers that are utilized in physical systems and the simulation can be utilized to build the physical system. In addition, the simulation and validation can be utilized in connection with the physical system to simulate and validate potential changes prior to making the changes.

Figure 7:
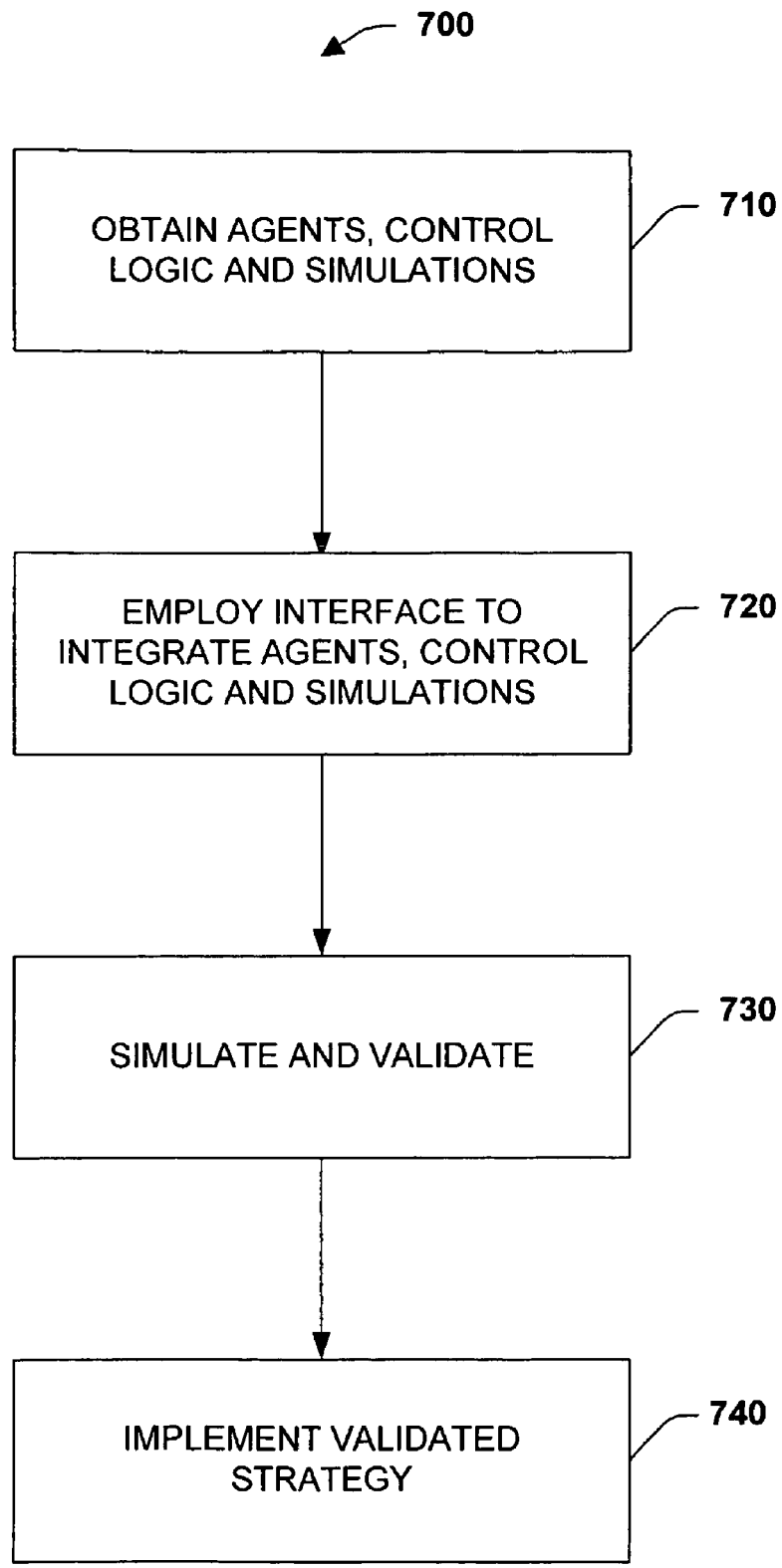
FIG. 7 illustrates an exemplary method for simulating and validating a control system through intelligent agents, control logic and simulations.

FIG. 7 illustrates a methodology 700 that integrates intelligent agents, control logic and simulation in order to simulate and validate a control strategy. At 710, one or more agents, sets of control logic and simulations are obtained. The agents can be generated utilizing protocols such as FIPA interaction protocols, ContractNet, and the like wherein JDL can be utilized to represent planning, commitment, and execution phases during task negotiation. The control logic can be programmed in various languages such as ST, SFC, FBD, IL, LD, C, C++, C#, GML, XML, HTML, Java, Flow-Charts, and the like. The simulations can be created with off-the-shelf simulation packages and/or proprietary programs. Examples of such simulation tools include Simulink, LabVIEW, SPICE, ACSL, Arena, AnyLogic, ad-hoc and/or the like.

At reference numeral 720, the agents, control logic and simulations can be provided to a common interface that integrates the agents, control logic, and simulations within a similar environment. In one example, the agents and control logic can be combined prior to being conveyed to the common interface. For example, an XML or other language based representation of the agents and control logic can be created and provided to the common interface. In another example, the agents, control logic and/or simulations are individually provided to the common interface. The common interface can provide various adapters, connectors, etc. to communicate with these entities as well as various other entities. In addition, the common interface can utilize various mechanisms such as a translator, a mapper, etc. to facilitate communication. At 730, the agents, control logic, and simulations are utilized to simulate and validate the system and control thereof. A presentation or visualization mechanism can be utilized to provide an interface for a user to interact and/or observe simulations and/or validations. At reference numeral 740, the validated strategy can be implemented to control a physical system. It is to be appreciated that during execution of the physical system, the agents and/or control logic can be modified, and/or a new simulation solution can be tested and validated.

Figure 8:
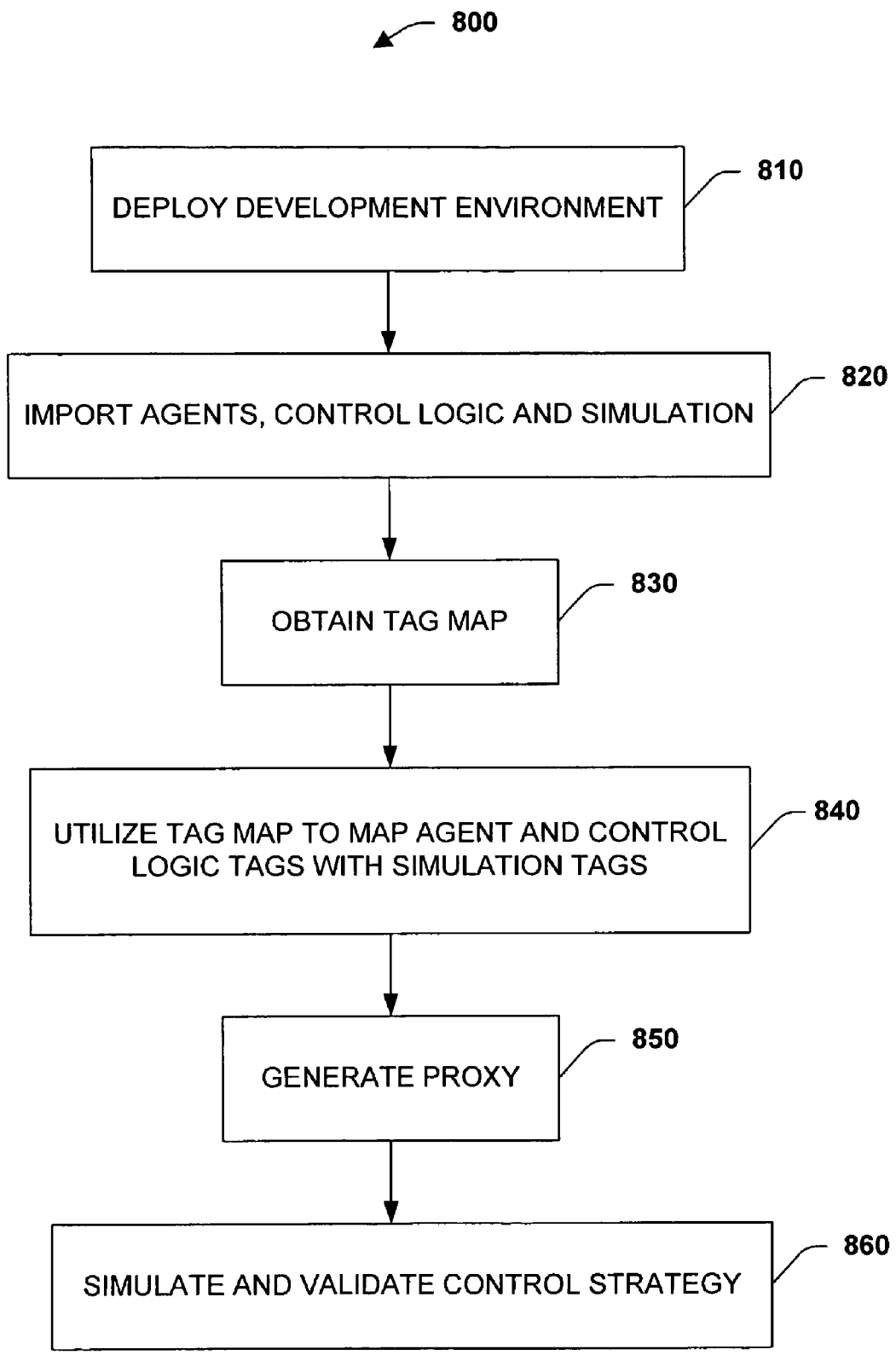
FIG. 8 illustrates an exemplary method that employs a markup language to facilitate integrating agents, control logic and simulation for simulating and validating an industrial control strategy

FIG. 8 illustrates a methodology 800 that employs a markup language to facilitate integrating agents, control logic, and simulation for simulating and validating an industrial control strategy. At 810, one or more developer can employ a development environment to generate intelligent agents and control logic, which can be conveyed, along with associated tags, and/or imported to an interface component. At reference numeral 820, the intelligent agents and control logic can be serially and/or concurrently conveyed to an interface component. The agents and control logic are conveyed in their native languages, a similar language, and/or a markup language such as XML. At 830, a tag map can be conveyed to the interface component and the tag map can be utilized to map between tags associated with agents, control logic and/or simulation. At 840, the tag map can be utilized to map the agents and control logic to the simulation. For example, the agents and control logic can be merged with the simulation. At 850, the merged simulation and agents and control logic can be provided to the interface component, wherein a proxy can be generated and utilized to facilitate interaction between the agents, control logic and/or simulation. At reference numeral 860, the agents, control logic and simulations are utilized to simulate and validate the system and control thereof.

Figure 9:
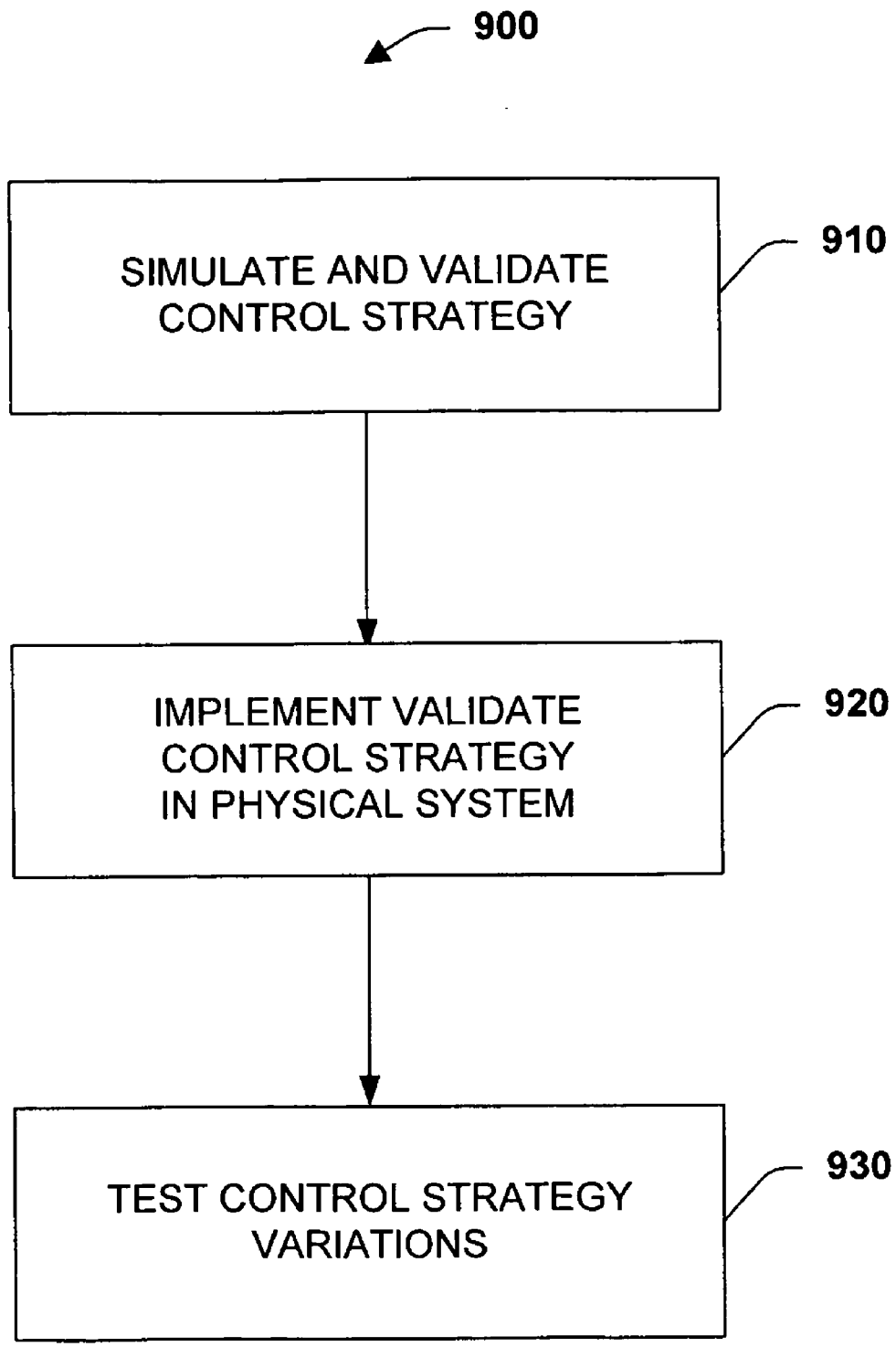
FIG. 9 illustrates an exemplary method for utilizing a validated control strategy.

FIG. 9 illustrates a methodology 900 that integrates simulation and physical systems for control strategy simulation and validation. At 910, agents, control logic and simulation are utilized to simulate and validate a physical control system as described herein. At 920, the validated agents, control logic, and simulation are employed in a physical system. For example, the agents and control logic can be loaded in soft and/or hard controllers. In addition, a physical system can be built based on the simulation. At 930, the simulation and validation techniques described herein to test new strategies and/or refine the systems.

Figure 10:
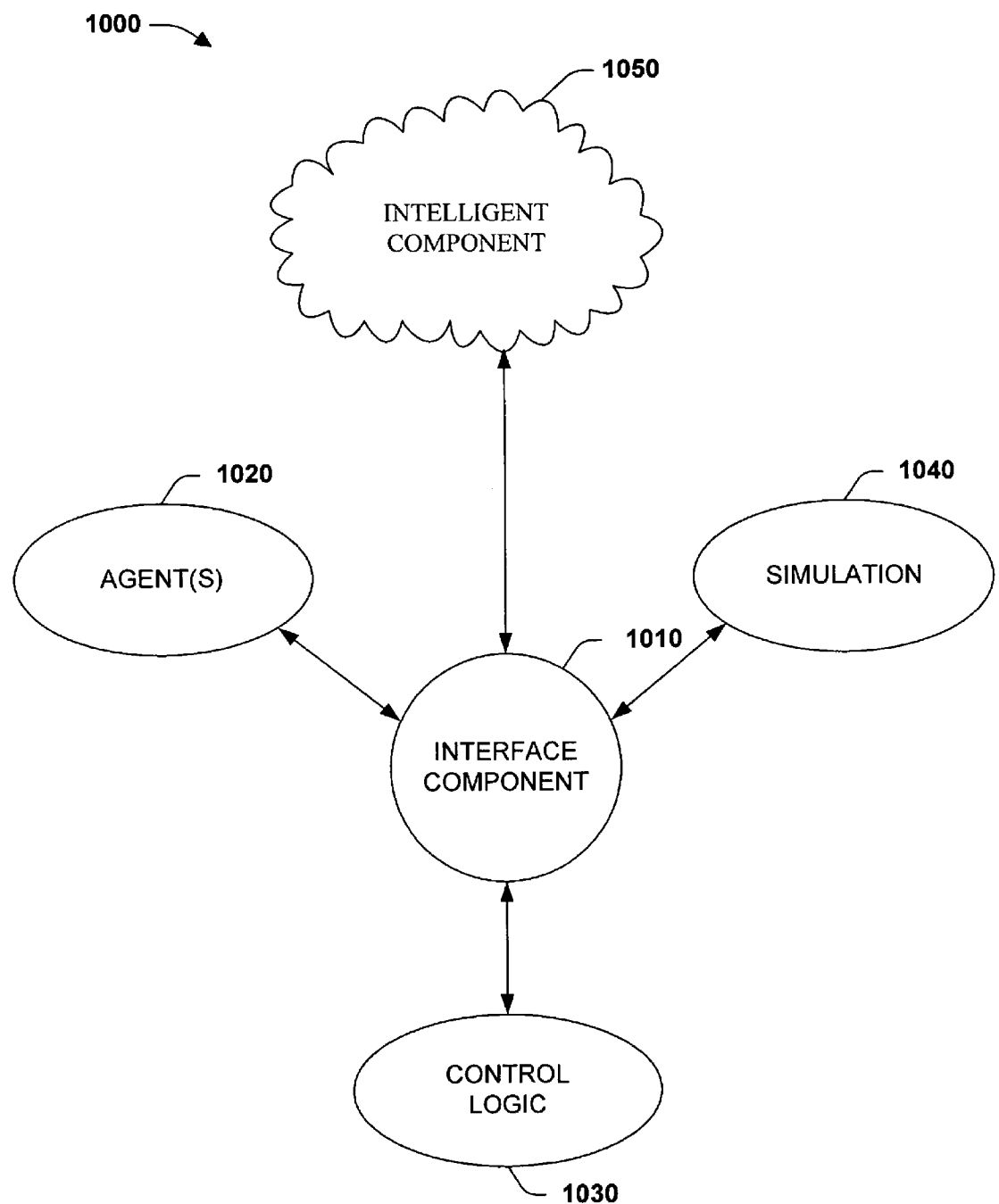
FIG. 10 illustrates an exemplary system that employs intelligence to facilitate simulation and validation of a control strategy.

FIG. 10 illustrates a system 1000 that employs intelligence to facilitate control strategy simulation and validation. The system 1000 includes an interface component 1010 that provides adapters, connectors, interfaces, channels, etc. various entities (virtual and/or physical) that collectively can form a plant (virtual and/or physical) and associated control. As depicted, such entities can include intelligent agents 1020, control logic 1030, and simulations 1040. It is to be understood that the interface component 1010 can also provide adapters, connectors, interfaces, channels, etc. to other entities such as visualization, soft and/or hard industrial controllers, HMIs, development environments, graphical user interfaces, application programming interfaces, and/or physical machines, apparatuses, processes, equipment, etc. The interface component 1010 can bridge such entities together as described herein.

The system 1000 further includes an intelligent component 1050 that can facilitate control strategy simulation and validation. For example, the intelligent component 1050 can facilitate communication between the intelligent agents 1020, the control logic 1030 and the simulations 1040. In another example, the intelligent component 1050 can facilitate merging the intelligent agents 1020 and the control logic 1030 with the simulations 1040. For example, the intelligent component 1050 can facilitate generating an XML file that includes the agents 1020 and the control logic 1030 and/or mapping tags between this XML file and the simulations 1040. In yet another example, the intelligent component 1050 can facilitate synchronizing controllers and/or events. In still another example, the intelligent component 1050 can facilitate modifying the intelligent agents 1020, the control logic 1030, and the simulations 1040 during simulation and validation; generating testing scenarios; implementing validated control strategies; updating the intelligent agents 1020, the control logic 1030 and the simulations 1040. It is to be understood that the foregoing examples are illustrative and that the intelligent component 1050 can be utilized in connection with the interface component 1010 to facilitate any function, capability, etc. associated therewith.

It is to be understood that the intelligent component 1050 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Figure 11:
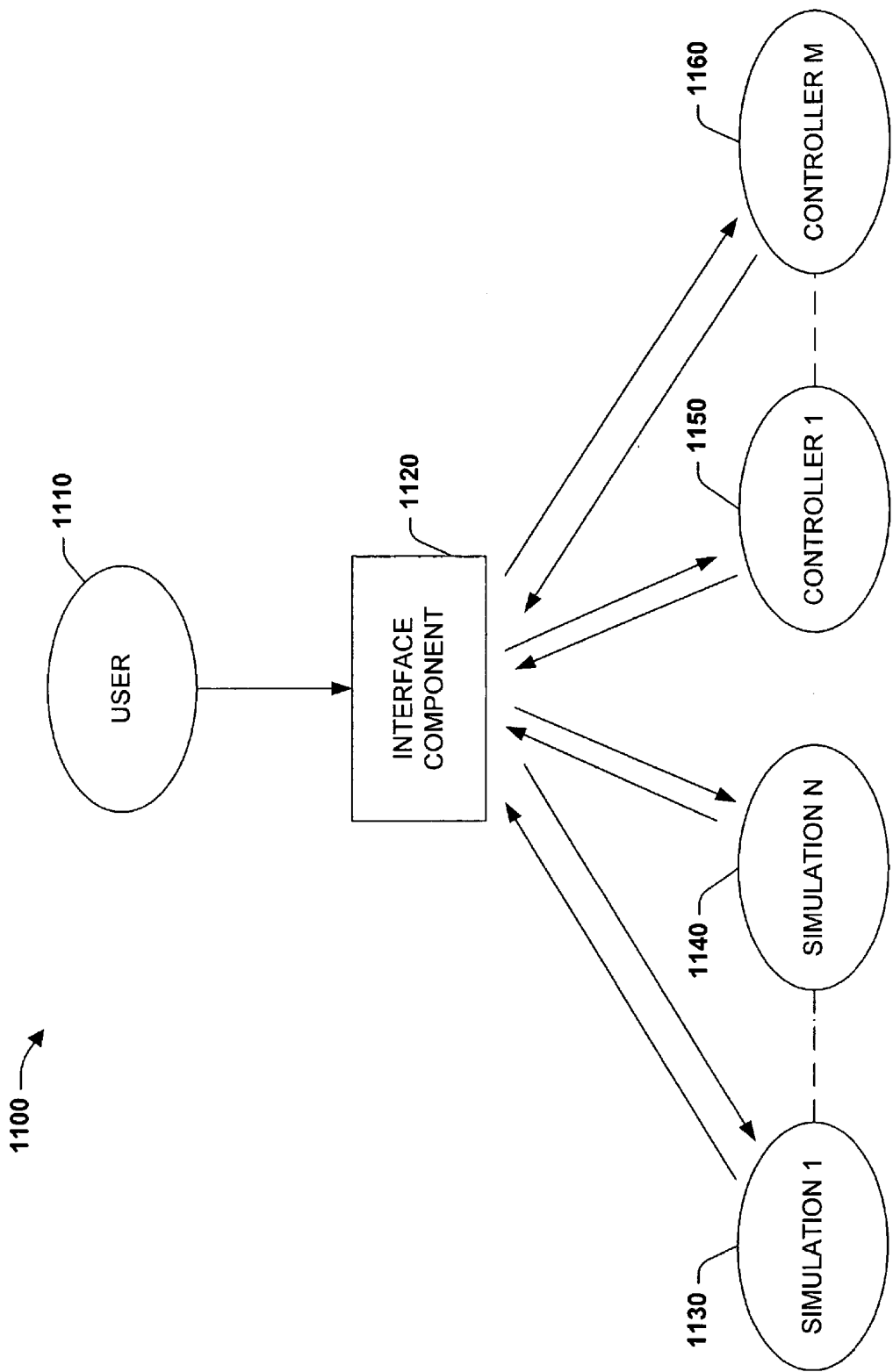
FIG. 11 illustrates an exemplary diagram for registering simulation and informing controllers.
Figure 12:
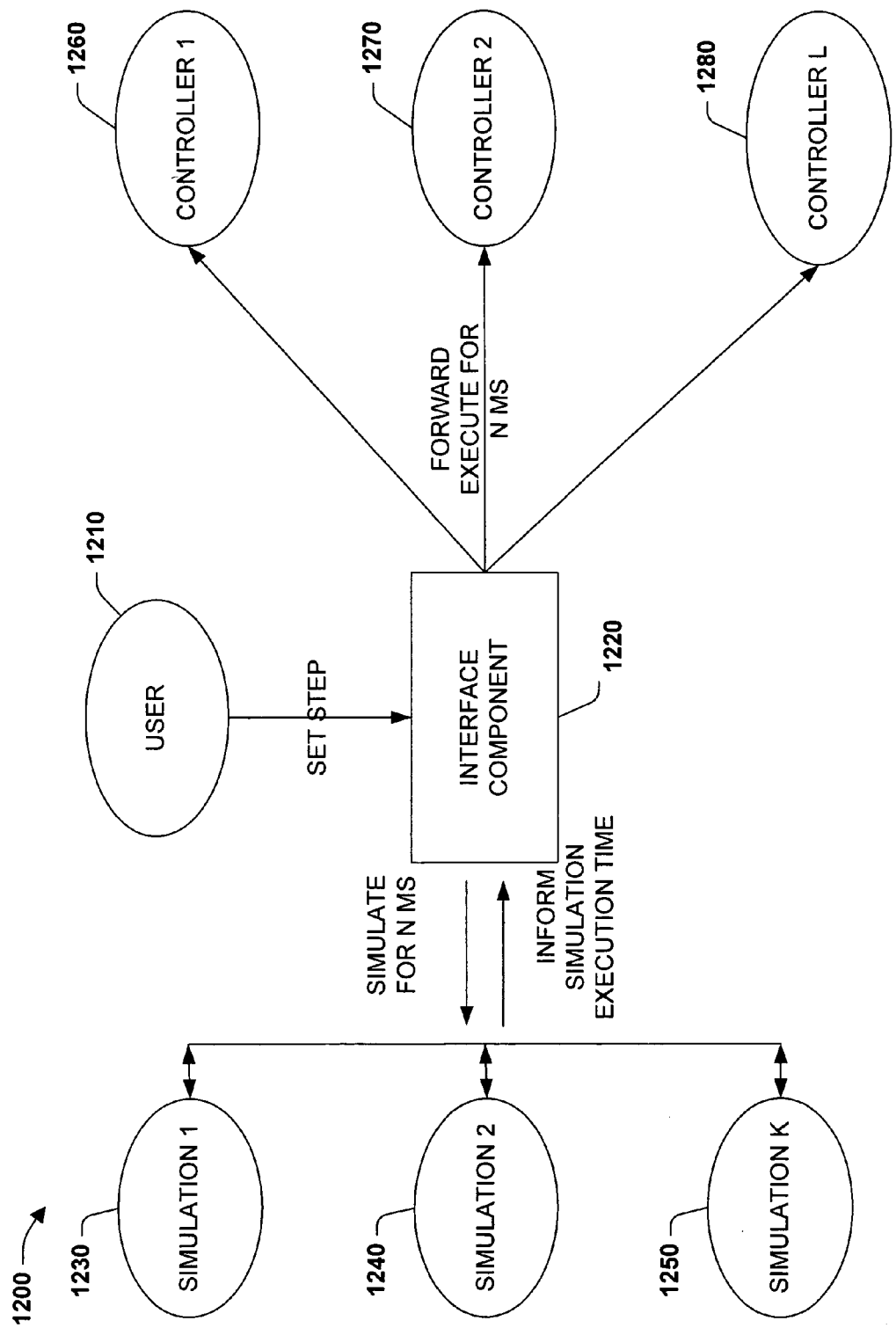
FIG. 12 illustrates an exemplary diagram for synchronizing controllers and simulation clocks.
Figure 13:
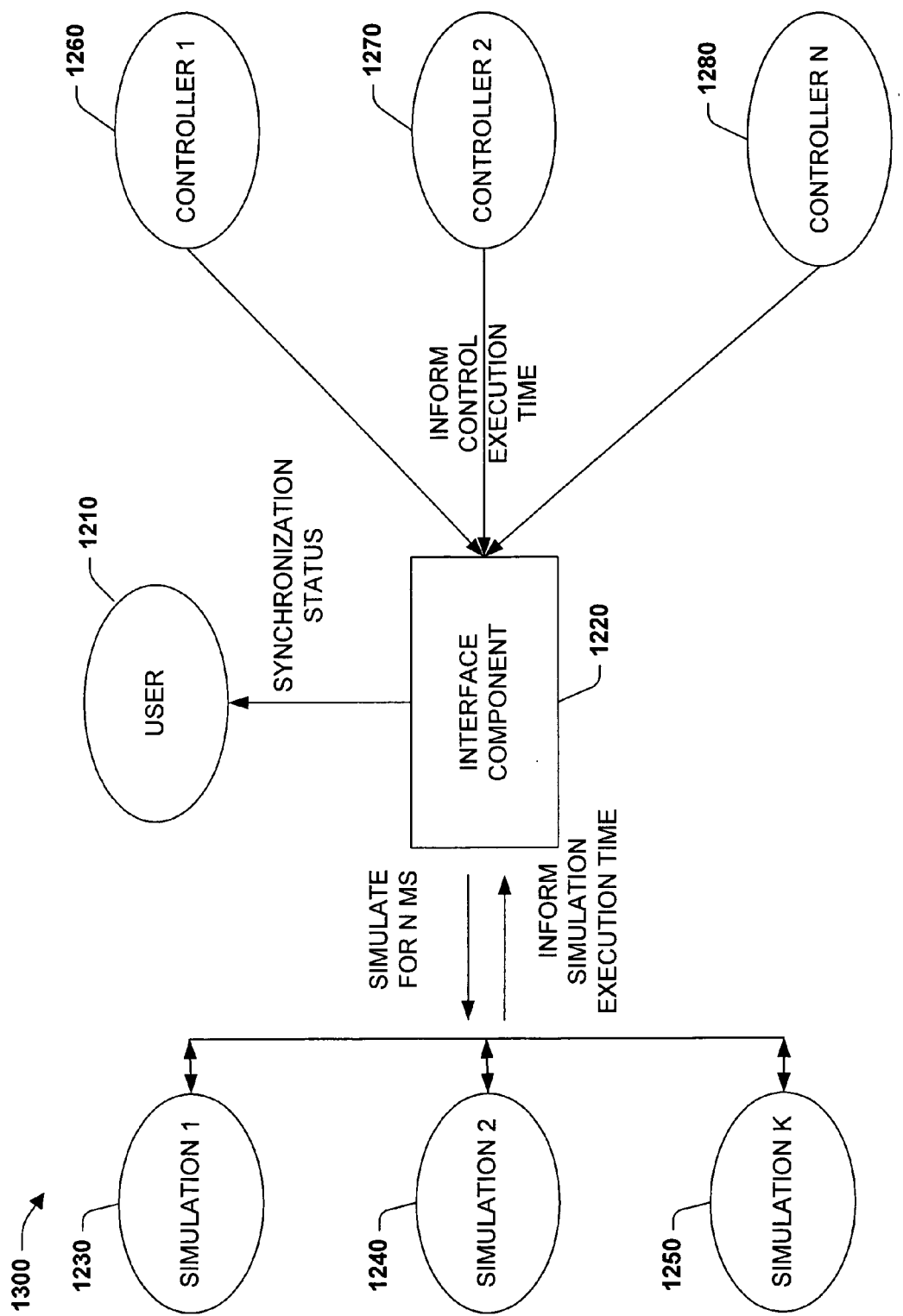
FIG. 13 illustrates an exemplary diagram for synchronizing controllers and simulation clocks.

FIGS. 11-13 illustrate various synchronization diagrams in accordance with aspects of the subject invention. FIG. 11 depicts a diagram 1100 that can be utilized to register distributed nodes. The diagram 1100 includes a user 1110 who can create a system topology. Such topologies can be generated essentially in any language. In one instance, XML can be utilized. This topology can be provided to the interface component 1120. The interface component 1120 can interact with simulations 1130-1140, which include N simulations, where N is an integer equal to or greater than one. In addition, the interface component 1120 can interact with controllers 1150-1160, which include M controllers, where M is an integer equal to or greater than one. Interaction between the plurality of simulation 1130-1140 and the interface component 1120 can include registration communications, and interaction between the plurality of controllers 1150-1160 and the interface component 1120 can include inform notifications. In one example, the user 1110 can provide the topology to the interface component 1120. The interface component 1120 can utilize this topology to facilitate registering the plurality of simulations 1130-1140 and informing the plurality of controllers 1150-1160. The interface component 1120 can then be employed to the simulations 1130-1140 and the controllers 1150-1160 for simulating and validating a control strategy.

FIGS. 12 and 13 depict diagrams 1200 and 1300 that can be utilized to synchronize one or more controllers with one or more simulations. Referring initially to FIG. 12, a user 1210 can define and convey a step to an interface component 1220. The interface component 1220 can invoke K simulations 1230, 1240 and 1250, wherein K is an integer equal to or greater than one, to perform one or more simulations for n milliseconds (ms), where n is a real number. Respective simulations 1230-1250 can inform the interface component 1220 with simulation execution times. The interface component 1220 can invoke L controllers 1260, 1270, and 1280, where L is an integer equal to or greater than one, to execute for n ms. Moving to FIG. 13, the controllers 1260, 1270, and 1280 can inform the interface component 1220 with respective control execution times. The interface component 1220 can invoke the simulations 1230-1250 to simulate for n ms. The simulation 1230 can inform the interface component 1220 of the simulation execution times, and the interface component 1220 can notify the user 1210 of a synchronization status. The foregoing typically is utilized because each simulation and/or each controller does not necessarily execute in real-time. For example, due to load, software revision, etc. the controllers may execute for different lengths of time. In addition, simulation typically is performed in much less time than physical systems.

Figure 14:
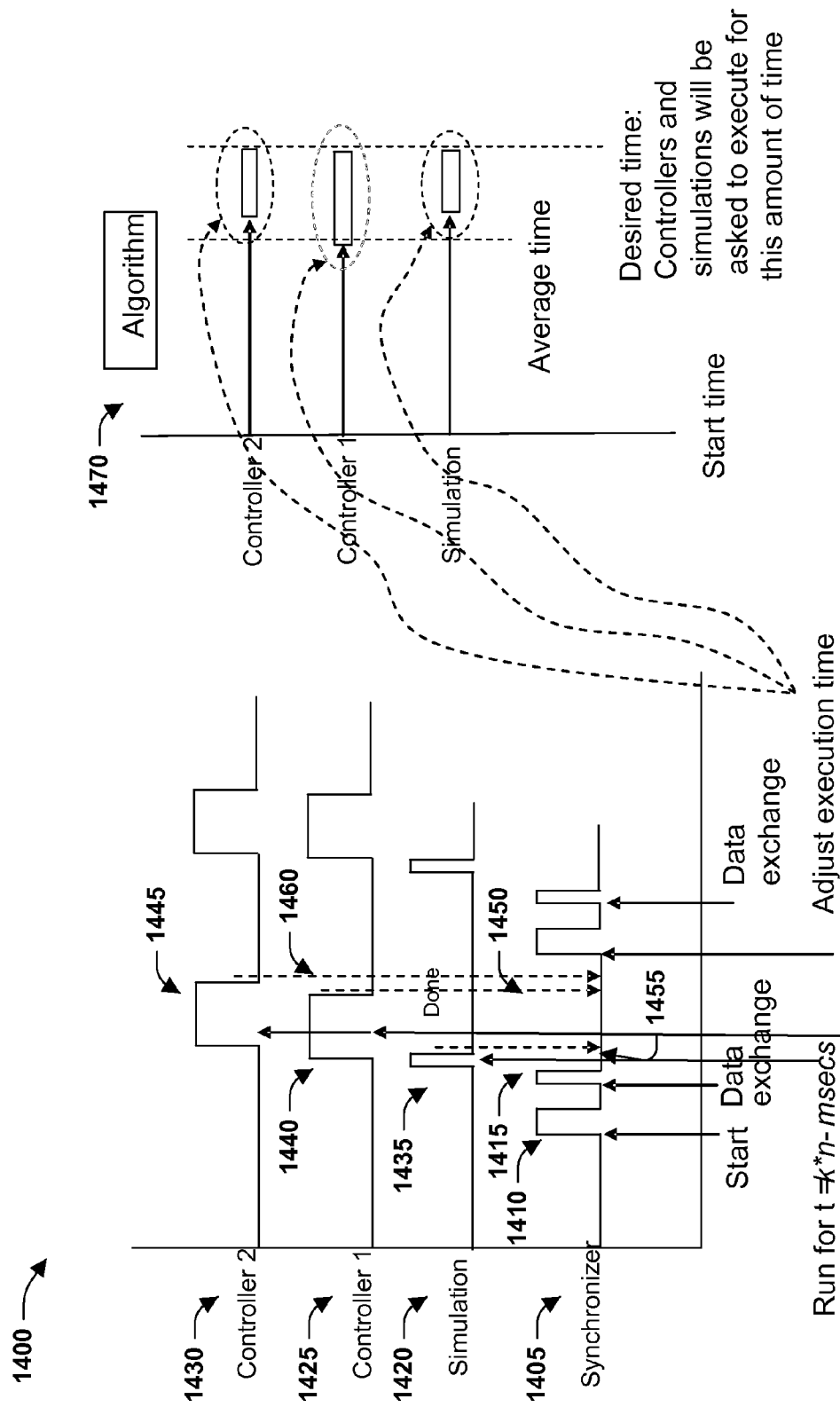
FIG. 14 illustrates an exemplary technique for synchronizing controllers and simulation clocks.

FIG. 14 illustrates an exemplary technique 1400 for synchronizing of events between a simulation and one or more controllers. It is to be understood that the technique 1400 is provided for explanatory purposes and does not limit the invention. Various other synchronization techniques, including known techniques, can be employed in accordance with aspects of the subject invention. As depicted, a synchronizer 1405 conveys a start pulse 1410 to begin a data exchange for a synchronization process. As depicted, the falling edge of a pulse 1415 invokes a data exchange in a simulation 1420 a controller 1425 and a controller 1430. The duration of the respective data exchange is determined. In this example, an execution time 1435 is determined for the simulation 1420; an execution time of 1440 is determined for the controller 1425; and an execution time of 1445 is determined for the controller 1430. In this example, the execution times 1435, 1440, and 1445 are all different as illustrated by the respective execution ending points 1450, 1455, and 1460. This information is utilized in connection with an algorithm 1470 that determines execution times adjustments such that the simulation 1420, the controller 1425, and the controller 1430 are synchronized. In one aspects of the invention, such synchronization means that the simulation 1420, the controller 1425, and the controller 1430 will appear to start and end at substantially the same time.

Figure 15:
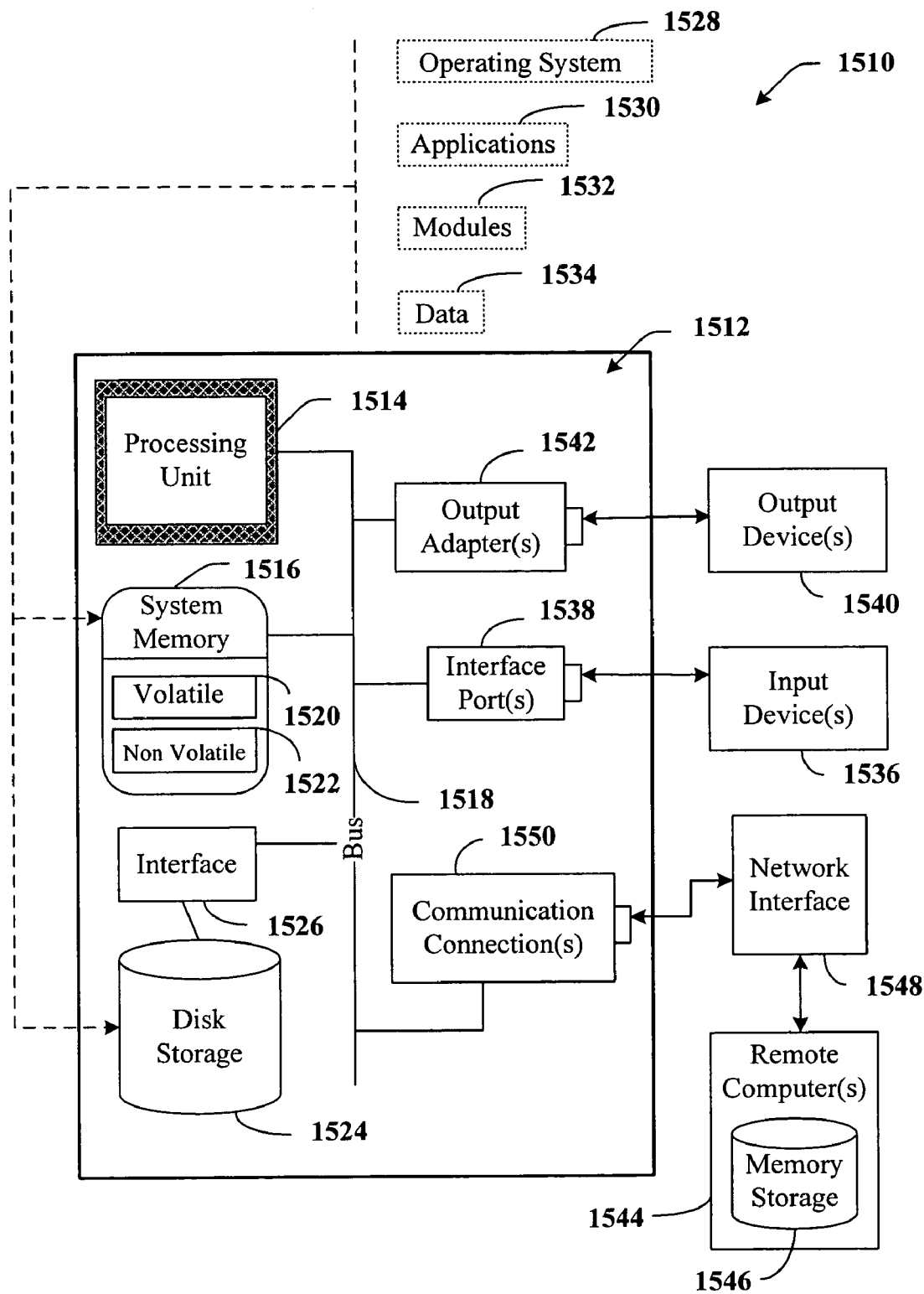
FIG. 15 illustrates an exemplary computing architecture that can be employed in connection with the subject invention.
Figure 16:
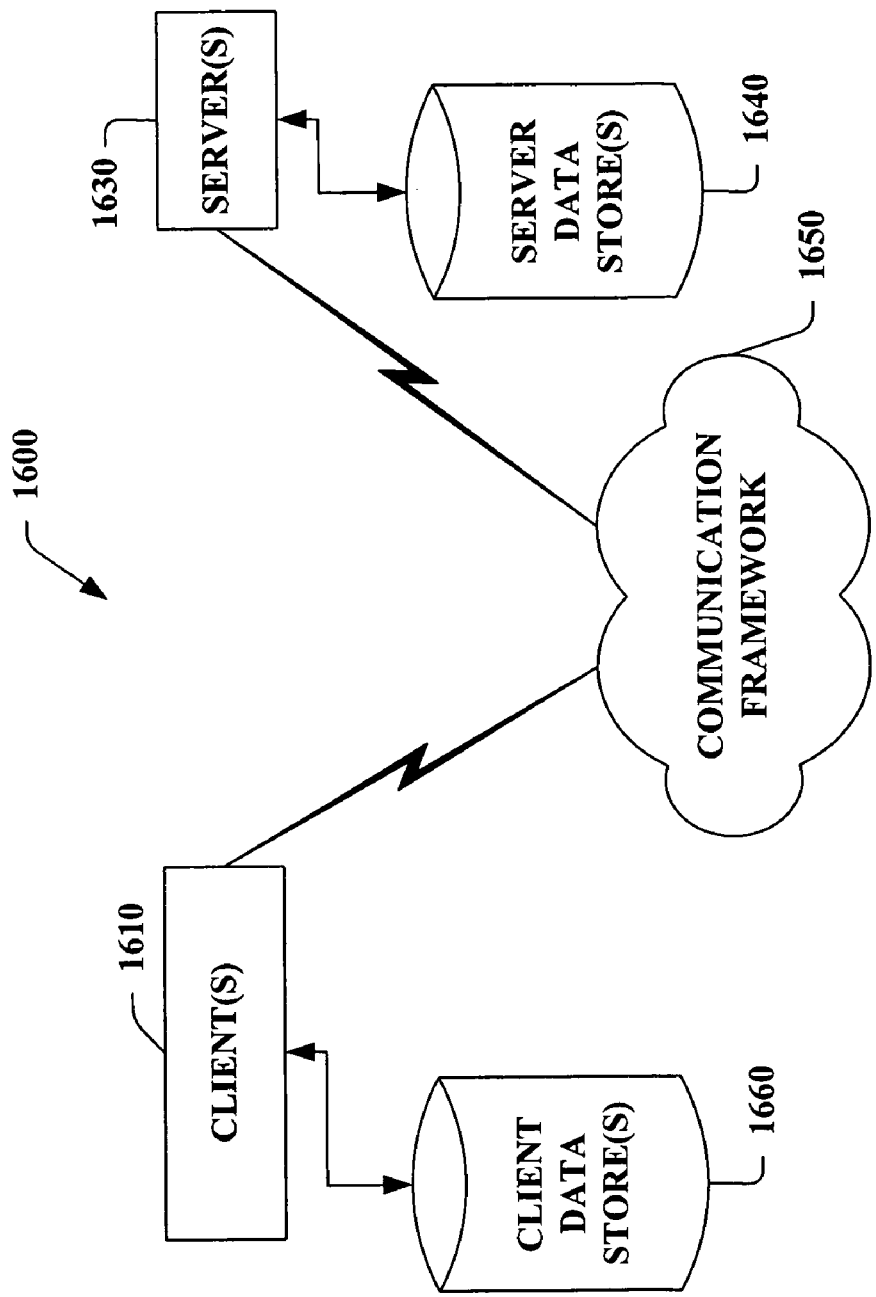
FIG. 16 illustrates an exemplary networking environment that can be employed in connection with the subject invention.

In order to provide a context for the various aspects of the invention, FIGS. 15 and 16 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 15-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), or flash memory. Volatile memory 1520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the present invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512 and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

FIG. 16 is a schematic block diagram of a sample-computing environment 1600 with which the present invention can interact. The system 1600 includes one or more client(s) 1610. The client(s) 1610 can be hardware and/or software (e.g., threads, processes, computing devices). The system 1600 also includes one or more server(s) 1630. The server(s) 1630 can also be hardware and/or software (e.g., threads, processes, computing devices). The servers 1630 can house threads to perform transformations by employing the present invention, for example. One possible communication between a client 1610 and a server 1630 can be in the form of a data packet adapted to be transmitted between two or more computer processes. The system 1600 includes a communication framework 1650 that can be employed to facilitate communications between the client(s) 1610 and the server(s) 1630. The client(s) 1610 are operably connected to one or more client data store(s) 1660 that can be employed to store information local to the client(s) 1610. Similarly, the server(s) 1630 are operably connected to one or more server data store(s) 1640 that can be employed to store information local to the servers 1630.

Figure 17:
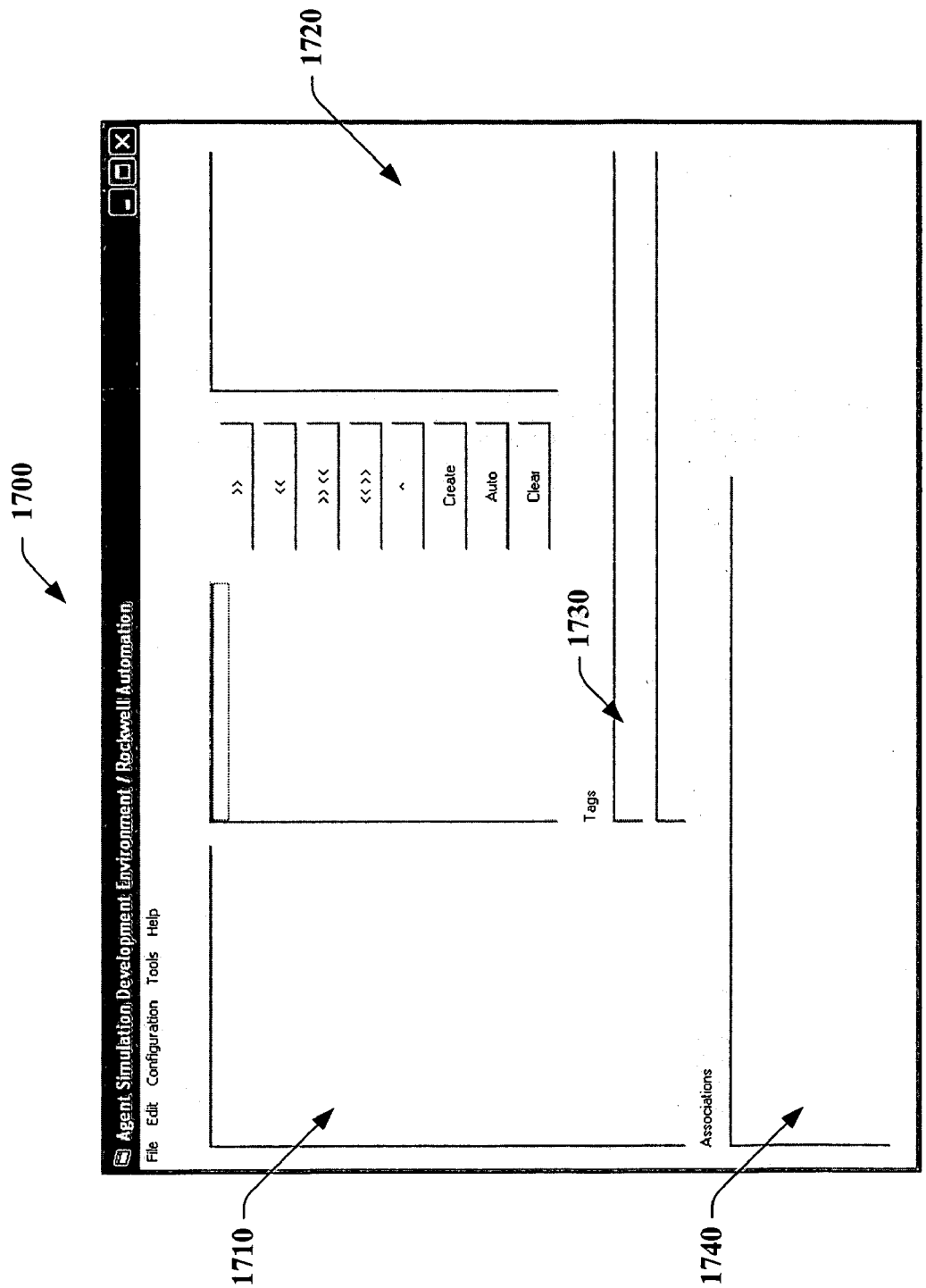
FIGS. 17-24 illustrate various user interfaces that can be employed to facilitate simulation and validation of a control strategy
Figure 18:
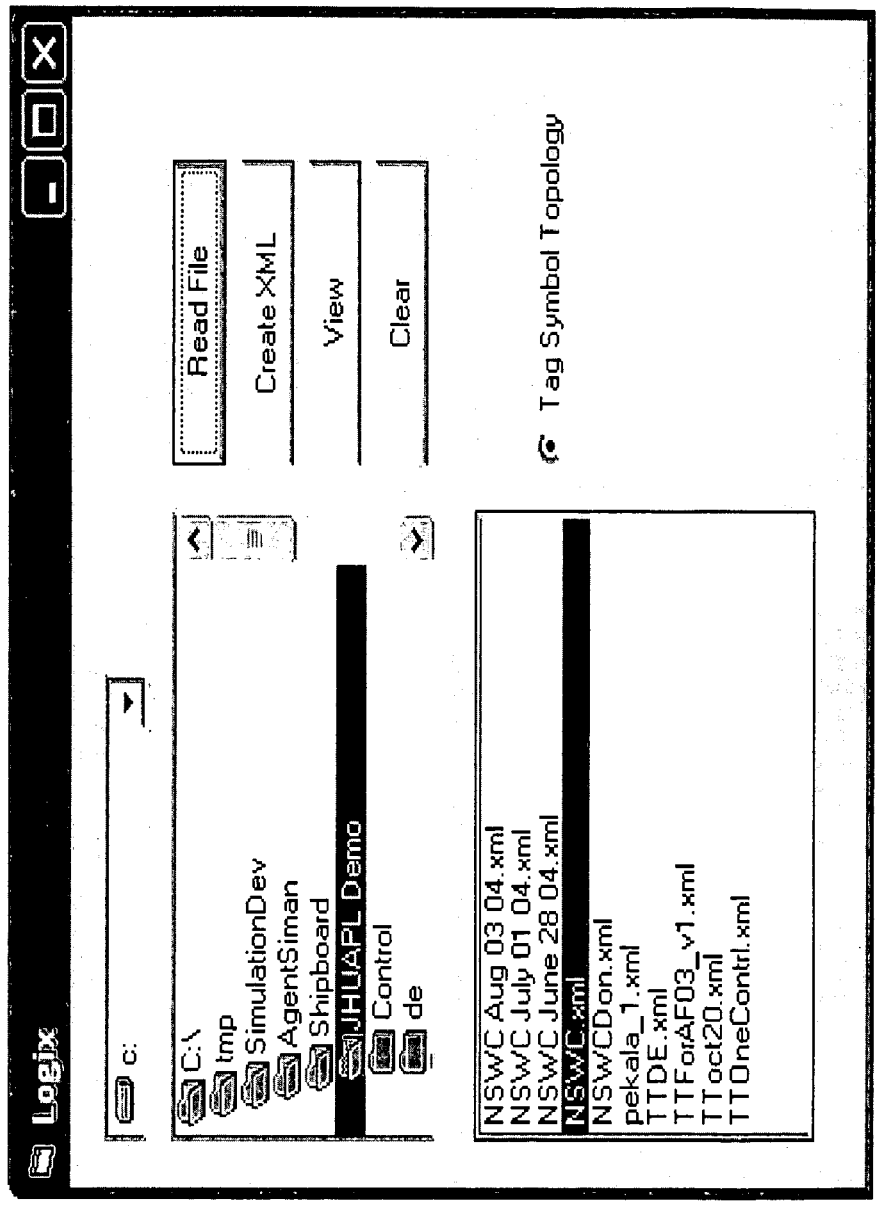
Figure 19:
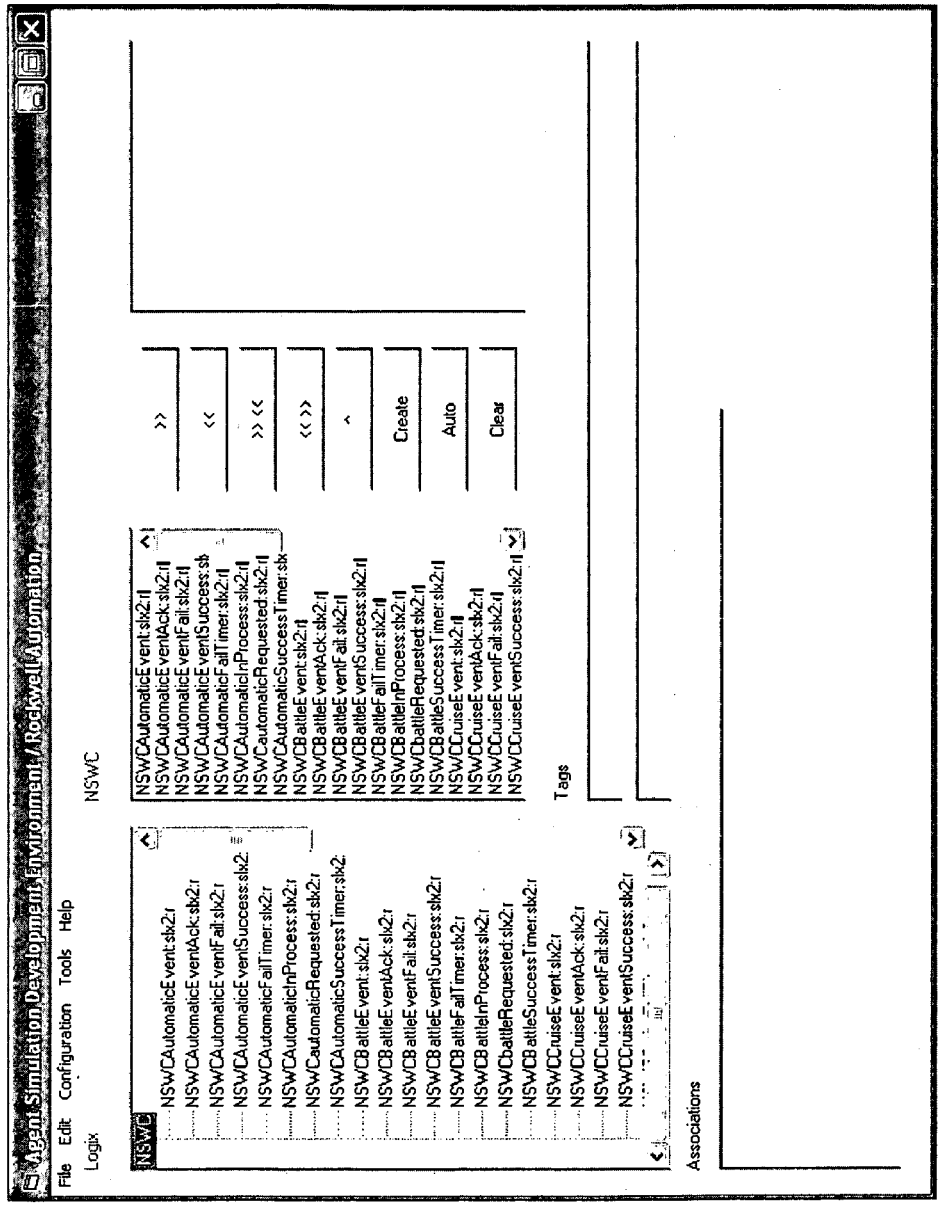
Figure 20:
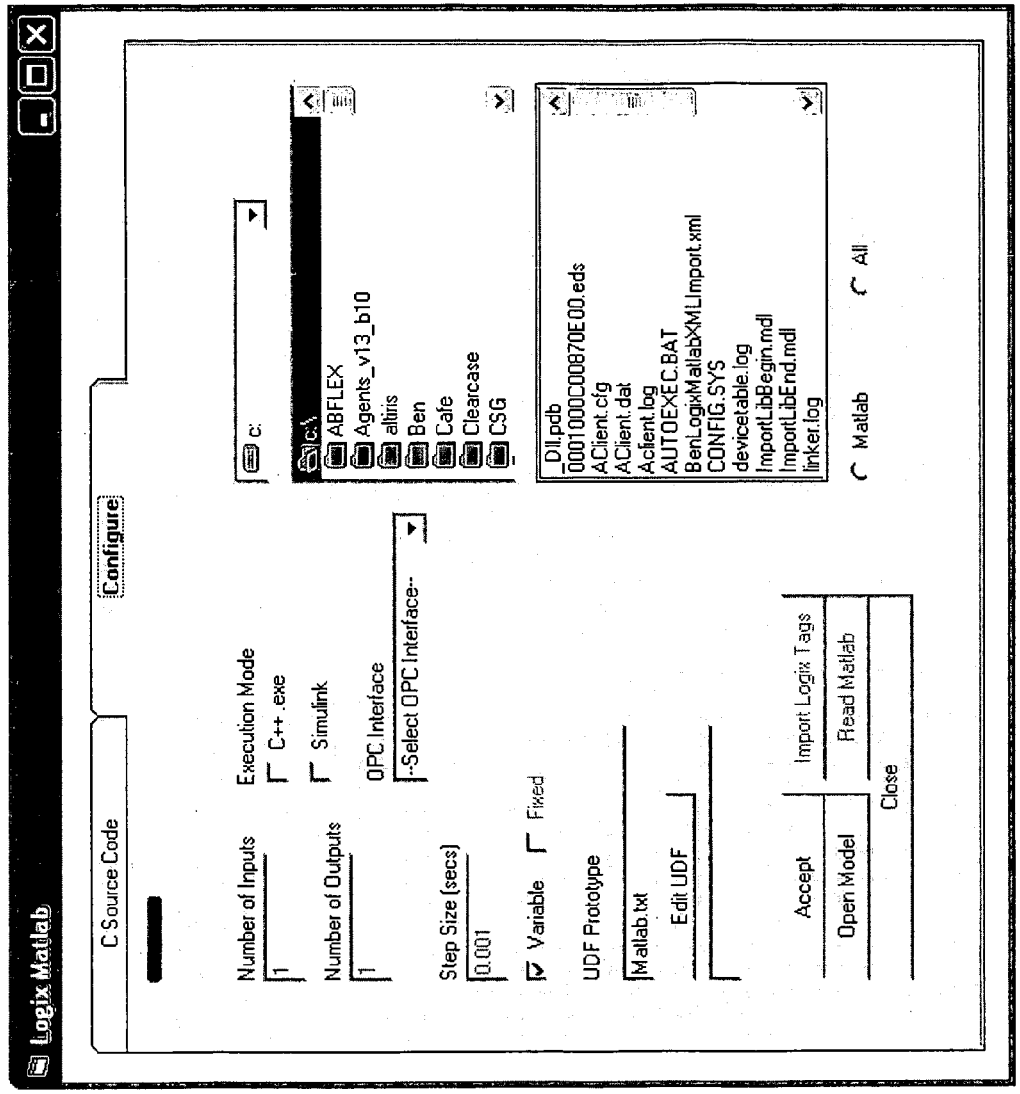
Figure 21:
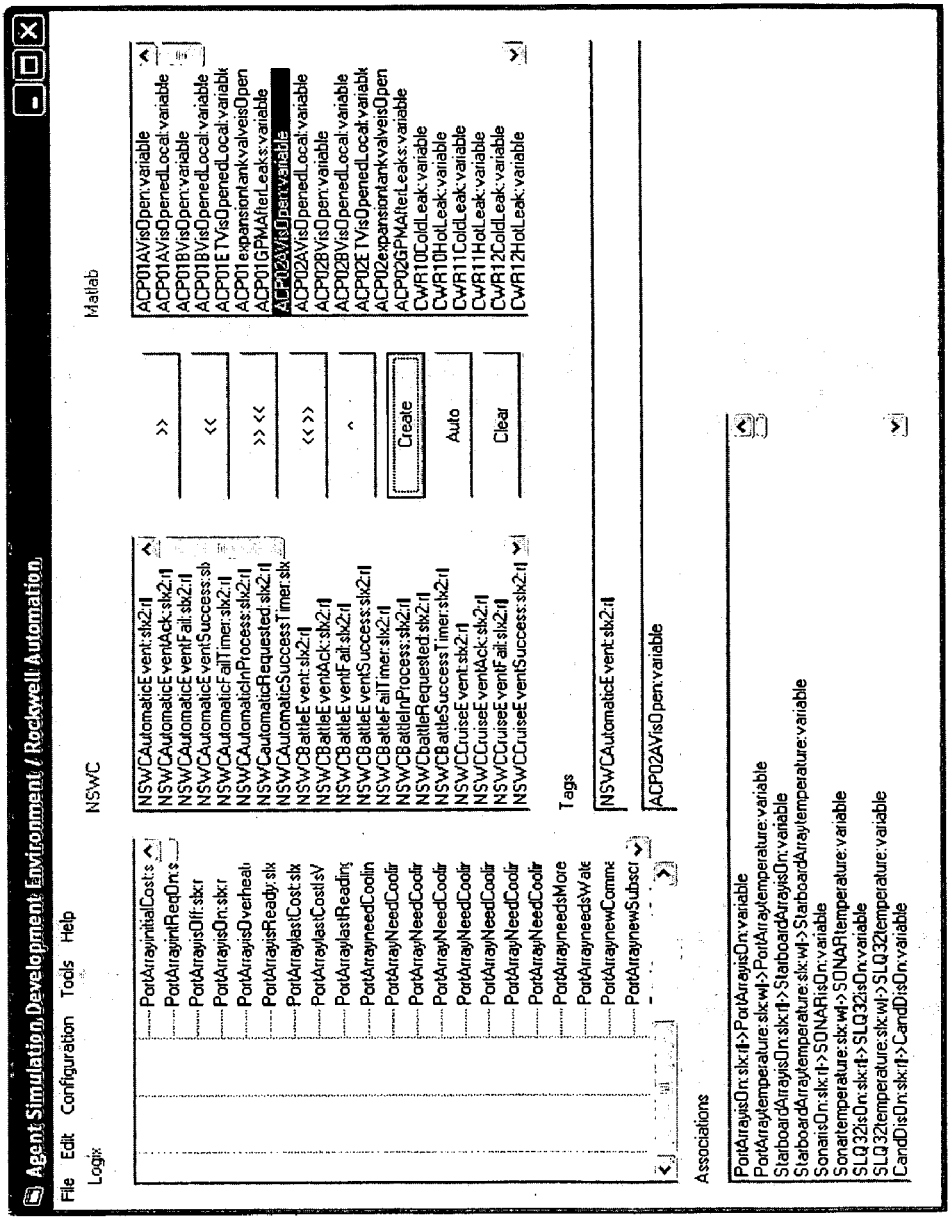
Figure 22:
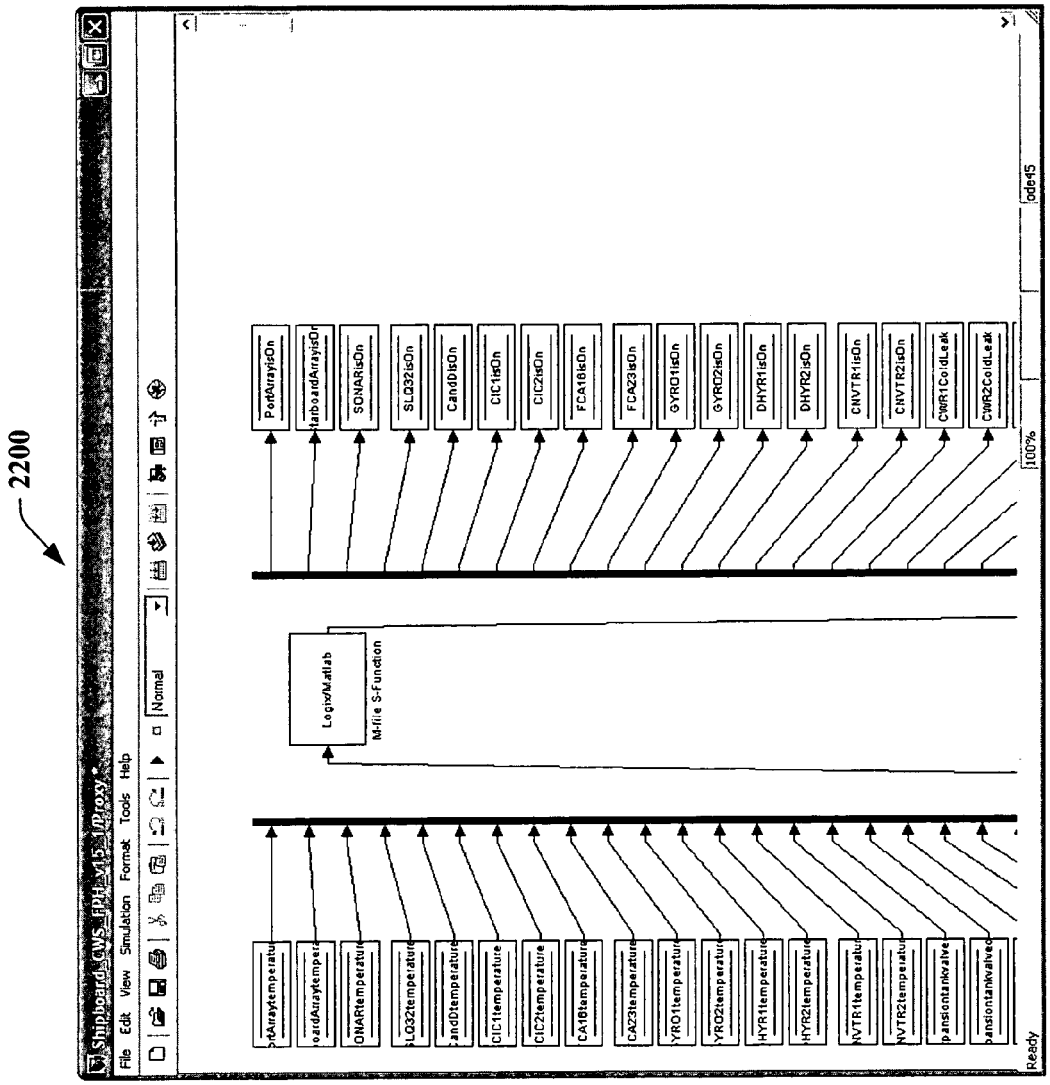
Figure 23:
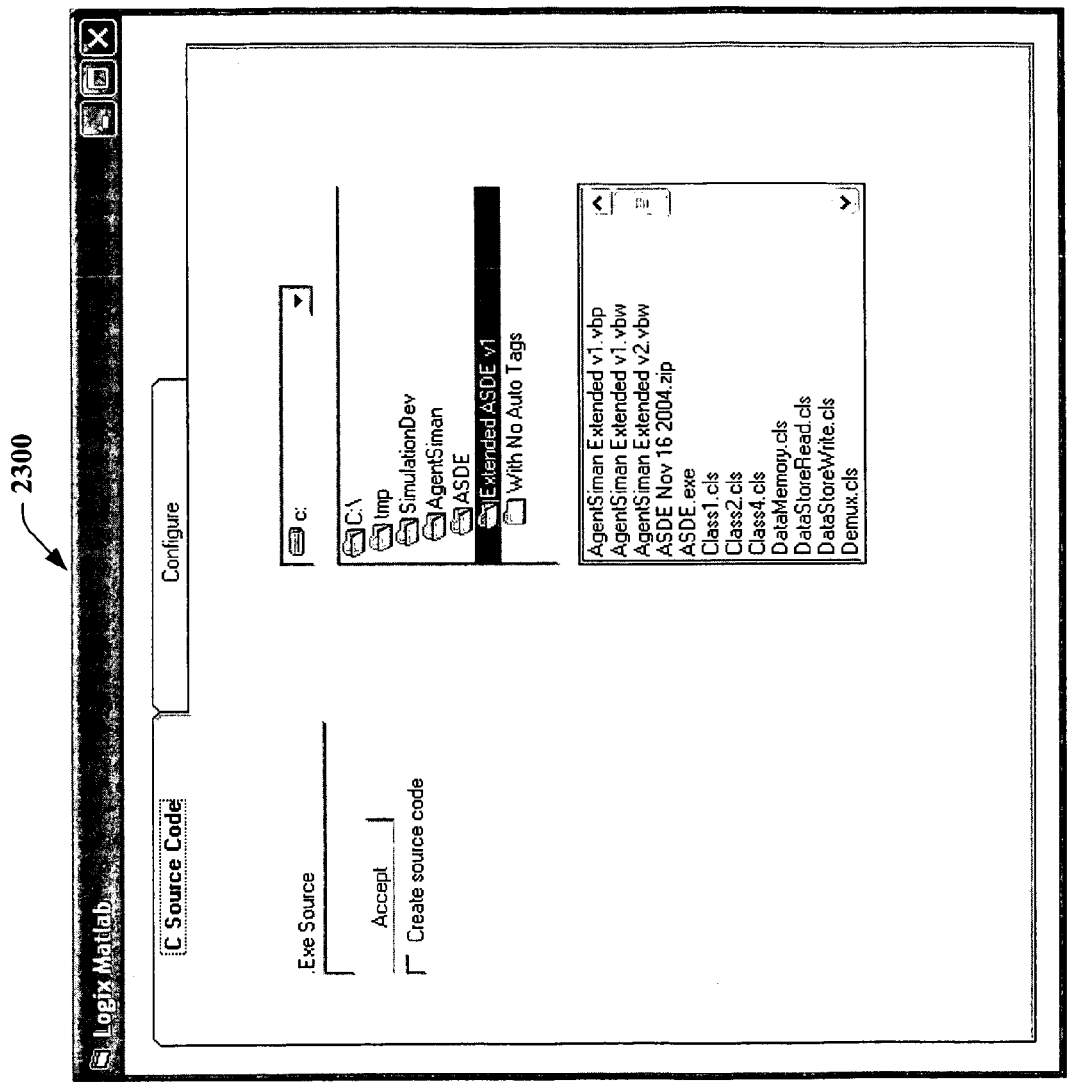
Figure 24:
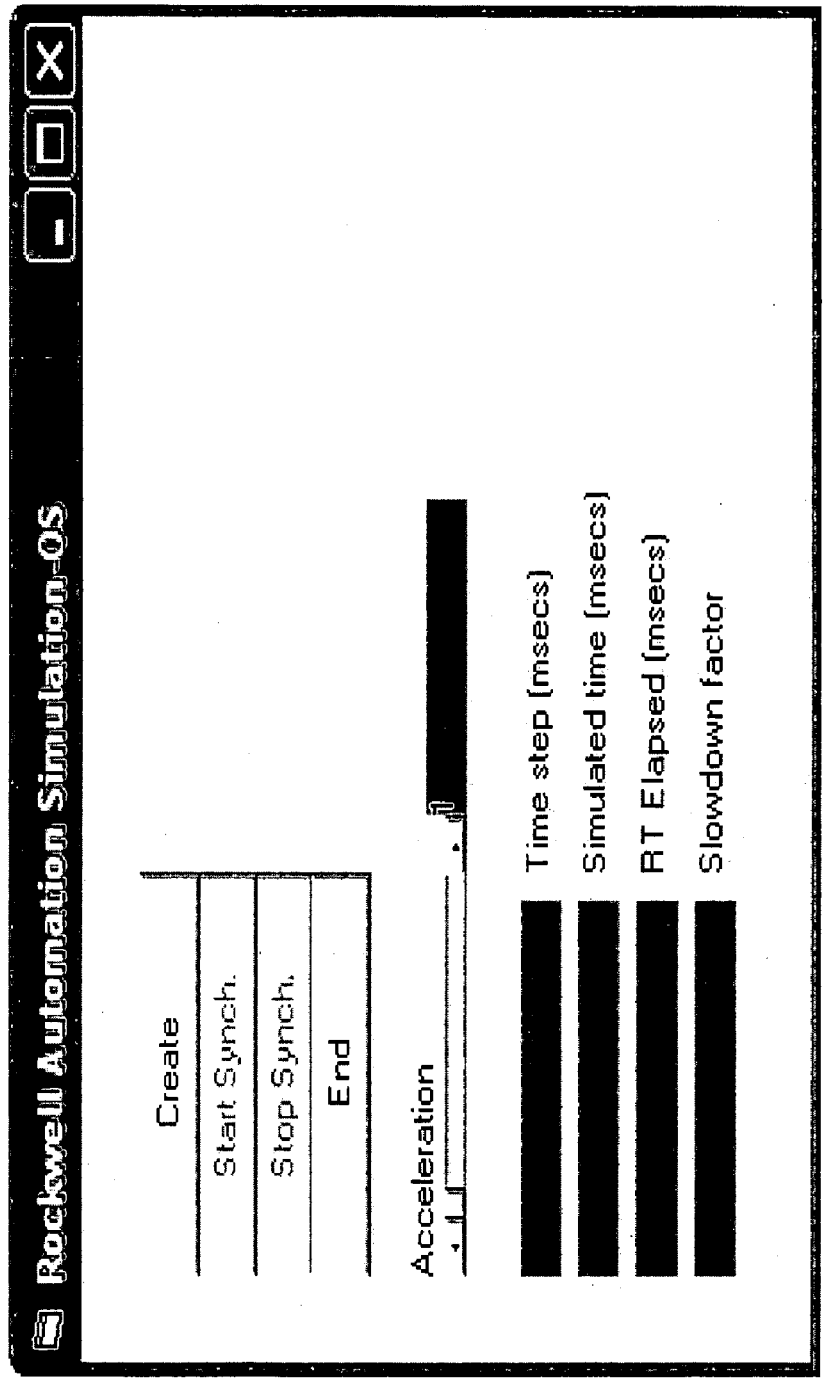

FIGS. 17-24 illustrate various user interfaces that can be utilized in connection with the systems and methods described herein. For example, these user interfaces can be utilized in connection with the presentation component 290 of system 200 of FIG. 2. FIG. 17 illustrates an exemplary graphical user interface (GUI) 1700 of an environment that can facilitate integrating agents, control logic and simulations, and simulation and validation of control solution. The GUI 1700 includes regions for displaying agent/control logic tags 1710, simulation tags 1720, a mapping scheme 1730, and associations 1740. FIG. 18 illustrates an exemplary GUI 1800 that can be utilized to load an XML based file with agent and control logic tags. FIG. 19 illustrates the GUI 1700 with agent/control logic tags loaded. FIG. 20 illustrates an exemplary GUI 2000 that can be utilized to select a simulation. FIG. 21 illustrates the GUI 1700 with agent/control logic tags and simulation tags loaded, a tag mapping scheme selected, and resultant associations. FIG. 22 illustrates a GUI 2200 which depicts an association between the agent/control logic tags and the simulation tags. FIG. 23 illustrates a GUI 2300 for generating an executable simulation that utilizes the agent/control logic and the loaded simulation. FIG. 24 illustrates a GUI 2400 for adjusting acceleration during simulation.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates validating a control strategy, comprising:
   a processor;
   a memory communicatively coupled to the processor, the memory having stored therein computer-executable instructions to implement the system, including:
      a merger component configured to receive control logic for controlling a physical system and one or more intelligent agents that perform autonomous decision-making and interact with one another to facilitate task negotiation in order to perform control of the physical system in conjunction with the control logic, the merger component configured to convert the control logic and one or more intelligent agents into a common format and to combine the control logic and the one or more intelligent agents into a combined file;
      an interface component configured to merge the combined file with at least two simulations to generate a proxy that communicatively couples at least two controllers executing the one or more intelligent agents and the control logic with the at least two simulations, wherein the proxy maps one or more first tags associated with the combined file to one or more second tags associated with the at least two simulations, and wherein the control logic and the one or more intelligent agents control the at least two simulations through the proxy to validate the control strategy; and
      a synchronizer configured to initiate respective data exchanges with the at least two controllers and the at least two simulations, to determine respective duration times for the data exchanges, and to calculate respective execution time adjustments for the at least two controllers and the at least two simulations that cause execution of a process on the at least two controllers and on the at least two simulations to at least one of begin or end substantially simultaneously.

2. The system of claim 1, wherein the one or more intelligent agents and the control logic are converted to an extensible markup language (XML) based format prior to being merged with the at least two simulations.

3. The system of claim 1, wherein the proxy is further utilized to interface the one or more intelligent agents with the at least two simulations.

4. The system of claim 1, wherein the proxy is a mapping of one or more symbols associated with the one or more intelligent agents and the control logic with one or more symbols associated with the at least two simulations.

5. The system of claim 4, wherein the one or more symbols associated with the one or more intelligent agents and the control logic and the one or more symbols associated with the at least two simulations are tags.

6. The system of claim 1, further comprising a presentation component that provides visualization of the one or more intelligent agents, the control logic and the at least two simulations.

7. The system of claim 1, further comprising at least one software-based controller configured to execute the one or more intelligent agents and the control logic and at least one simulator configured to execute the at least two simulations, wherein the proxy facilitates interaction between the software-based controller and the at least one simulator.

8. The system of claim 1, further comprising a physical industrial controller configured to execute validated intelligent agents and control logic to control the physical system represented by the at least two simulations.

9. The system of claim 1, wherein the at least two simulations are generated in one of Simulink, Arena, 20-sim, LabVIEW, VisSim, Advanced Continuous Simulation Language (ACSL), or Easy5.

10. The system of claim 1, wherein the interface component allows dynamic modification of at least one of the one or more intelligent agents, the control logic, or the at least two simulations during validation.

11. The system of claim 1, wherein the one or more intelligent agents, the control logic, and the at least two simulations are developed under rules that define a common set of symbols.

12. The system of claim 4, wherein the proxy is an Open Process Control (OPC) connection.

13. A system that facilitates simulating and validating a control solution, comprising:
 a processor;
 a memory communicatively coupled to the processor, the memory having stored therein computer-executable instructions to implement the system, including:
  two or more soft controllers that execute one or more intelligent agents and at least one control program that are designed to control a physical system, wherein the one or more intelligent agents perform autonomous decision-making and interact with one another to facilitate task negotiation in order to perform control of the physical system in conjunction with the at least one control program;
  two or more simulations of the physical system;
  a common interface component that converts the one or more intelligent agents and the at least one control program into a common format and combines the one or more intelligent agents and the at least one control program into a combined file;
  a common input/output component that merges the combined file with the two or more simulations to generate a proxy that maps at least a first tag associated with the one or more intelligent agents and the at least one control program with at least a second tag associated with the two or more simulations, the proxy allowing the one or more intelligent agents and the at least one control program to execute in connection with the two or more simulations to simulate the physical system under control of the one or more intelligent agents and the at least one control program in order to validate the control solution; and
  a synchronizing component that measures respective execution times for the two or more soft controllers and the two or more simulations and calculates respective execution time adjustments for the two or more soft controllers and the two or more simulations that substantially synchronize at least one processing event between the two or more soft controllers and the two or more simulations.

14. The system of claim 13, wherein the two or more simulations are utilized to implement the physical system, and the one or more intelligent agents and the at least one control program are downloaded to at least one hard controller, the at least one hard controller is coupled to the physical system through the common input/output component, and the one or more intelligent agents and the at least one control program control the physical system.

15. The system of claim 13, wherein the proxy is a markup language-based component that facilitates communication between the one or more intelligent agents, the at least one control program, and the two or more simulations.

16. The system of claim 13, wherein the proxy is a mapping of one or more symbols of the one or more intelligent agents and the at least one control program with one or more symbols of the two or more simulations.

17. The system of claim 13, wherein the two or more simulations are generated in a third party simulation environment.

18. The system of claim 13, wherein the common input/output component allows the one or more intelligent agents, the control program, and the two or more simulations to be dynamically modified during validation.

19. The system of claim 13, wherein the synchronizing component invokes respective data exchanges with the two or more soft controllers and the two or more simulations in order to measure the respective execution times for the two or more soft controllers and the two or more simulations.

20. The system of claim 13, further comprising a presentation component that visualizes the interaction of the one or more intelligent agents, the at least one control program, and the two or more simulations.

21. The system of claim 20, wherein the presentation component provides a region that displays one or more tags associated with at least one of the one or more intelligent agents, the at least one control program, the two or more simulations, or a mapping between the one or more tags of the one or more intelligent agents, the at least one control program, and the two or more simulations.

22. The system of claim 20, wherein the presentation component facilitates merging the one or more intelligent agents and the at least one control program with the two or more simulations and generating a proxy between the one or more intelligent agents, the at least one control program, and the two or more simulations.

23. The system of claim 20, wherein the presentation component facilitates modifying at least one of the one or more intelligent agents, the at least one control program, or the two or more simulations during validation.

24. A method that integrates intelligent agents, control logic, and simulation in order to simulate and validate a control strategy, comprising:
 a processor-implemented act of executing computer executable-instructions stored on a computer-readable storage medium to implement the following:
  generating one or more intelligent agents, control logic, and two or more simulations based on a common set of tags, wherein the one or more intelligent agents perform autonomous decision-making and interact with one another to facilitate task negotiation in order to perform control of a physical system in conjunction with the control logic;
  converting the one or more intelligent agents and the control logic into a common format;
  combining the one or more intelligent agents and the control logic into a combined file;
  coupling the combined file with the two or more simulations through a common interface by mapping one or more tags associated with the combined file with one or more tags associated with the two or more simulations;
  synchronizing the two or more simulations with two or more controllers executing the one or more intelligent agents and the control logic, the synchronizing comprising:
   initiating respective data exchanges with the two or more controllers and the two or more simulations;
   determining respective duration times for the data exchanges; and
   calculating respective execution time adjustments for the two or more controllers and the two or more simulations based on the execution times that cause execution of a process on the two or more controllers and the two or more simulations to at least one of begin or end substantially simultaneously; and
  concurrently utilizing the combined file and the two or more simulations to simulate and validate the physical system.

25. The method of claim 24, wherein the combining the one or more intelligent agents and the control logic further comprises integrating the one or more intelligent agents and the control logic into an extensible markup language (XML) schema.

26. The method of claim 25, wherein the coupling further comprises merging the XML schema with the two or more simulations.

27. The method of claim 24, further comprising executing the one or more intelligent agents and the control logic within the two or more controllers.

28. A method that simulates and validates an industrial control strategy, comprising:
 a processor-implemented act of executing computer executable-instructions stored on a computer-readable storage medium to implement the following:
  obtaining one or more intelligent agents and control logic designed to control an industrial system and at least two simulations of the industrial system, wherein the one or more intelligent agents perform autonomous decision-making and interact with one another to facilitate task negotiation in order to perform control of the industrial system in conjunction with the control logic;
  merging the one or more intelligent agents, the control logic, and the at least two simulations by mapping one or more tags associated with the one or more intelligent agents and the control logic with one or more tags associated with the at least two simulations;
  creating an executable based on the merging;
  measuring respective execution times for the control logic and the at least two simulations;
  calculating respective execution time adjustments for the control logic and the at least two simulations based on the execution times;
  applying the execution time adjustments to the control logic and the at least two simulations in order to substantially synchronize at least one processing event between the control logic and the at least two simulations;
  employing the executable to simulate the industrial system under control of the one or more intelligent agents and the control logic; and
  validating the control strategy.

29. The method of claim 28, further comprising generating the one or more intelligent agents through one of Foundation for Intelligent Physical Agents (FIPA) interaction protocols, an Autonomous Cooperative System/Job Description Language (ACS/JDL), or a ContractNet protocol.

30. The method of claim 28, further comprising generating the control logic through one of the following languages: structured text (ST), sequential function chart (SFC), functional block diagram (FBD), instruction list (IL), ladder diagram (LD), C, C++, C#, Graphical Motion Language (GML), markup language, Java, or Flow-Charts.

31. A method that employs a markup language to facilitate integrating intelligent agents, control logic, and simulation for simulating and validating an industrial control strategy, comprising:
 a processor-implemented act of executing computer-executable instructions stored on a computer-readable storage medium to implement the following:
  employing a development environment to create intelligent agents and control logic, wherein the intelligent agents perform autonomous decision-making and interact with one another to facilitate task negotiation in order to perform control of an industrial system in conjunction with the control logic;
  generating a mapping file for the intelligent agents and the control logic;
  combining the intelligent agents and the control logic into a combined file;
  conveying the combined file and the mapping file to an interface component;
  mapping tags associated with the combined file to tags of at least two simulations using the mapping file;
  merging the intelligent agents and the control logic with the at least two simulations through the mapping;
  creating a proxy that communicatively couples at least two controllers executing the intelligent agents and the control logic with the at least two simulations based on the merging;
  invoking respective data exchanges with the at least two controllers and the at least two simulations;
  measuring respective duration times for the data exchanges;
  adjusting execution times for the at least two controllers and the at least two simulations by amounts calculated based on the duration times such that execution of a process on the at least two controllers and on the at least two simulations at least one of begin or end substantially simultaneously; and
  utilizing the proxy to couple the at least two simulations with the intelligent agents and the control logic to simulate and validate the control strategy.

32. A system that facilitates validating a control strategy, comprising:
 a processor;
 a memory communicatively coupled to the processor, the memory having stored therein computer-executable instructions to implement the system, including:
  means for combining one or more intelligent agents and control logic into a markup language representation of the one or more intelligent agents and the control logic, wherein the one or more intelligent agents perform autonomous decision-making and interact with one another to facilitate task negotiation in order to perform control of a physical system in conjunction with the control logic;
  means for merging the markup language representation with two or more simulations to form a proxy that communicatively couples the one or more intelligent agents, the control logic, and the two or more simulations, wherein the proxy is a mapping of one or more tags associated with the intelligent agents and the control logic with one or more tags associated with the two or more simulations;
  means for synchronizing execution times of the control logic and the two or more simulations by adjusting the execution times by durations calculated based on measured response times for the control logic and the two or more simulations; and
  means for employing the proxy to control the two or more simulations with the one or more intelligent agents and the control logic to validate the control strategy.

* * * * *